US007284244B1

(12) United States Patent
Sankaranarayan et al.

(10) Patent No.: US 7,284,244 B1
(45) Date of Patent: Oct. 16, 2007

(54) RESOURCE MANAGER ARCHITECTURE WITH DYNAMIC RESOURCE ALLOCATION AMONG MULTIPLE CONFIGURATIONS

(75) Inventors: Mukund Sankaranarayan, Issaquah, WA (US); Jai Srinivasan, Kirkland, WA (US); Dale A. Sather, Seattle, WA (US); Andy R. Raffman, Woodinville, WA (US); Michael B. Jones, Redmond, WA (US); Sean C. McDowell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/565,284

(22) Filed: May 2, 2000

(51) Int. Cl.
*G06F 9/50* (2006.01)
*G06F 9/44* (2006.01)

(52) U.S. Cl. ....................................... 718/104; 718/103

(58) Field of Classification Search ................ 718/104, 718/103; 709/223–226
See application file for complete search history.

(56) References Cited

U.S. PATENT DOCUMENTS

| | | | | |
|---|---|---|---|---|
| 4,649,479 | A | | 3/1987 | Advani et al. |
| 4,941,084 | A | | 7/1990 | Terada et al. |
| 5,014,192 | A | | 5/1991 | Mansfield et al. |
| 5,421,011 | A | | 5/1995 | Camillone et al. |
| 5,450,570 | A | * | 9/1995 | Richek et al. ................ 710/10 |
| 5,504,670 | A | * | 4/1996 | Barth et al. ..................... 700/5 |
| 5,671,361 | A | | 9/1997 | Brown et al. |
| 5,737,611 | A | | 4/1998 | Vicik |
| 5,737,728 | A | | 4/1998 | Sisley et al. |
| 5,748,468 | A | | 5/1998 | Notenboom et al. |
| 5,781,736 | A | | 7/1998 | Schmidt |
| 5,793,979 | A | * | 8/1998 | Lichtman et al. ........... 709/226 |
| 5,826,082 | A | | 10/1998 | Bishop et al. |
| 5,838,968 | A | * | 11/1998 | Culbert ........................ 709/104 |
| 5,896,539 | A | * | 4/1999 | Arimilli et al. ............. 710/244 |
| 5,995,745 | A | | 11/1999 | Yodaiken |
| 6,105,098 | A | * | 8/2000 | Ninose et al. .............. 710/200 |

(Continued)

OTHER PUBLICATIONS

Foster, Ian et al. “A Distributed Resource Management Architecture that Supports Advance Reservations and Co-Allocation.” CITESEER. 1999.*

Katchabaw, Michael J. et al. “Using User Hints to Guide Resource Management for Quality of Service.” PDPTA 1999.*

(Continued)

*Primary Examiner*—Lewis A. Bullock, Jr.
(74) *Attorney, Agent, or Firm*—Lee & Hayes, PLLC

(57) ABSTRACT

Resource management architectures implemented in computer systems to manage resources are described. In one embodiment, a general architecture includes a resource manager and multiple resource providers that support one or more resource consumers such as a system component or application. Each provider is associated with a resource and acts as the manager for the resource when interfacing with the resource manager. The resource manager arbitrates access to the resources provided by the resource providers on behalf of the consumers. A policy manager sets various policies that are used by the resource manager to allocate resources. One policy is a priority-based policy that distinguishes among which applications and/or users have priority over others to use the resources. A resource consumer creates an “activity” at the resource manager and builds one or more “configurations” that describe various sets of preferred resources required to perform the activity. Each resource consumer can specify one or more configurations for each activity. If multiple configurations are specified, the resource consumer can rank them according to preference. This allows the resource consumers to be dynamically changed from one configuration to another as operating conditions change.

37 Claims, 18 Drawing Sheets

U.S. PATENT DOCUMENTS

| | | | | |
|---|---|---|---|---|
| 6,112,243 | A * | 8/2000 | Downs et al. | 709/226 |
| 6,185,221 | B1 | 2/2001 | Aybay | |
| 6,230,200 | B1 | 5/2001 | Forecast et al. | |
| 6,308,243 | B1 | 10/2001 | Kido | |
| 6,326,985 | B1 | 12/2001 | Tazoe et al. | |
| 6,338,072 | B1 | 1/2002 | Durand et al. | |
| 6,341,303 | B1 * | 1/2002 | Rhee et al. | 718/104 |
| 6,363,434 | B1 | 3/2002 | Eytchison | |
| 6,377,540 | B1 * | 4/2002 | Hogberg et al. | 370/216 |
| 6,418,447 | B1 | 7/2002 | Frey et al. | |
| 6,442,631 | B1 | 8/2002 | Neufeld et al. | |
| 6,470,339 | B1 | 10/2002 | Karp et al. | |
| 6,480,861 | B1 | 11/2002 | Kanevsky et al. | |
| 6,550,057 | B1 | 4/2003 | Bowman-Amuah | |
| 6,665,701 | B1 * | 12/2003 | Combs et al. | 718/104 |
| 6,779,182 | B1 | 8/2004 | Zolnowsky | |
| 6,799,208 | B1 * | 9/2004 | Sankaranarayan et al. | 709/223 |
| 6,886,042 | B1 | 4/2005 | Watahiki et al. | |
| 6,907,606 | B1 | 6/2005 | Jang | |

OTHER PUBLICATIONS

Halang, et al., “Enforcing Management Policies in Distributed Systems”, IEEE, Apr. 1995, pp. 474-480.

Huang, et al., “Policies In A Resource Manager Of Workflow System: Modeling Enforcement and Management”, IEEE, Mar. 1999, pp. 1-2.

* cited by examiner

RESULT: ACTIVITY A2'S
REQUEST DENIED

RESULT: ACTIVITY A1
PREEMPTED

RESULT: ACTIVITY A1 REDUCES USAGE OF $P_3$

RESULT: ACTIVITY A3'S REQUEST DENIED

Result: Activity A1 is Upgraded to Configuration C1 and The Resource for Activity A2 is Reserved

RESOURCE MANAGER ARCHITECTURE WITH DYNAMIC RESOURCE ALLOCATION AMONG MULTIPLE CONFIGURATIONS

TECHNICAL FIELD

This invention relates to computers and more particularly, to systems and methods for managing resources of the computers.

BACKGROUND

Computers are evolving well beyond their traditional desktop roots. In addition to conventional desktop applications (e.g., word processing, spreadsheets, email, etc.), today's personal computers (PCs) are asked to play audio and video files, play music CDs (compact discs), receive and display broadcast programming, and so forth. Much of this evolution is being driven by the continued convergence of computing, Internet, telephony, and entertainment technologies.

As a result, the look, feel, and functionality of computers are continuing to evolve for different consumer and operating environments. For instance, computers designed for home entertainment might be implemented as a set-top box or a game console, equipped with browser software, one or more tuners, EPG (electronic programming guide) software, different audio/video drivers, and gaming software. Computers designed for office use may resemble conventional desktop PCs in appearance, but be implemented with broadcast tuners, DVD (digital video disks) drives, stereo speakers with surround sound, and so forth, to offer a more enhanced computing experience. The variety and functionality of portable computers are even wider ranging as the demands of the mobile user increase.

As computers are asked to perform more diverse tasks, it is not uncommon for users to expect performance of multiple tasks simultaneously. Due to this increasing user demand, there is more demand being placed on the existing resources to handle the various tasks. This unfortunately leads to a greater likelihood that the computer may not have sufficient resources at a requested time to accomplish all of the tasks simultaneously.

This resource shortfall is perhaps most evident for computers designed for the home entertainment environment. Such computers must not only be able to perform multiple functions simultaneously, but must also satisfy the demands of multiple different users. For instance, one user may request that the entertainment computer record a program at a specific time while another user may request the computer to tune to a different program at the same time. This a problem if the computer only has one tuner because it cannot possibly accomplish both tasks concurrently.

In such situations, the computer is at a loss to distinguish which task should be performed and which should not. Today, applications obtain resources on first-come or last-come basis. Accordingly, the applications control resource allocation irrespective of the users' desires. In the above example, if the television application seizes control of the tuner over the recorder application, the television application will control the resource (i.e., tuner) even though the users may be far more interested in recording the first program rather than watching the second program. Once the application obtains the resource, the resource is held by the application until it explicitly relinquishes the resource.

Thus, as the demand for resources continues to grow, there is greater need for techniques to manage the resources and their allocation to different users and/or applications.

SUMMARY

Resource management architectures implemented in computer systems to manage resources are described.

In the described implementation, a general architecture includes a resource manager and multiple resource providers that support one or more resource consumers such as a system component or application. Each provider is associated with a resource and acts as the manager for the resource when interfacing with the resource manager. The resource manager arbitrates access to the resources provided by the resource providers on behalf of the consumers.

A policy manager may be optionally included in the architecture to set various policies that are used by the resource manager to allocate resources. One policy that can be used by the resource manager is a priority-based policy to determine which applications and/or users have priority over others to use the resources.

In the described embodiment, each resource provider registers with the resource manager. A resource consumer creates an "activity" at the resource manager and builds one or more "configurations" that describe various sets of resources required to perform the activity. The activity is implemented as a container data structure that holds the configurations, and each configuration is implemented as a data structure that contains the identities of the resources. The resource manager maintains the activities and configurations.

In the described embodiment, each resource consumer can specify one or more configurations for each activity. If multiple configurations are specified, the resource consumer can rank them according to preference. This allows the resource consumers to be dynamically changed from one configuration to another as operating conditions change. In one aspect, resources that are needed elsewhere by a higher priority resource consumer can be secured by asking a current resource consumer to use a less preferred configuration, or give up entirely its resource configuration or particular needed resource. When those resources subsequently become available again, the resource manager can notify the resource consumer so that the resource consumer can request to upgrade to the preferred configuration.

In one embodiment, the resource manager exposes a set of application program interfaces (APIs). The resource consumers and resource providers use the APIs to communicate with the resource manager and to perform such functions as registering resources, creating activities, and building configurations.

In one embodiment, the resource consumer is aware of only a subset of the resources (and hence their resource providers) that are necessary for the resource consumer to perform a task. These resources, in turn, may rely on other resources that are unknown to the resource consumer to perform the task. The resource providers are configured to receive calls to build the configurations. Those resource providers that are known to the resource consumer are called directly by the resource consumer. Those resource providers that are not known to the resource consumer are called by the resource providers that use their resources.

In one embodiment, when the resource providers are called, they provide information to the resource manager that enables the resource manager to manage one or more configurations. One particular implementation is a hierarchical tree configuration that describes resource dependencies between the different resource providers. The hierarchical nature of the configuration facilitates resource reservation and error reporting to the resource consumer.

In one embodiment, error notifications are generated when a resource reservation fails or preemption occurs. The hierarchical nature of the configuration makes error reporting more efficient by tracing each dependent resource provider through its parent(s) until a resource provider is found that is known to the resource consumer. This known resource provider is then able to articulate the error to the resource consumer in terms that the resource consumer will understand. The report can take different forms. For example, the report may be a simple notification that the requested known resource is unavailable. The report might also present different options to the resource consumer (e.g., alternate resource settings to use to perform the task).

One aspect of the described embodiment provides a trouble-shooting feature that attempts to remedy errors at the resource provider level rather than reporting the error to the resource consumer.

In one embodiment, an intelligent interface component is provided to interface with the resource manager on behalf of the resource consumer so that the resource consumer does not need to know what resources it requires. The interface component is designed to understand which resources are needed for certain activities. The intelligent interface component acts as a proxy resource consumer that can receive calls from the resource consumer to build a particular configuration. The intelligent interface component then interacts with the resource manager for purposes of building the configurations and requesting reservations of the resources.

In one embodiment, a so-called "stateless" provider is employed. The stateless provider is designed so that the provider does not maintain resource allocation or ownership information, even for the resources it manages. Specifically, and in the described embodiment, a stateless provider has no concept of time or whether it is being requested now or in the future, but only what resources and how much of them are being used at any given request. A separate scheduling component runs "what if" scenarios to determine whether resources will be available at selected times in the future.

BRIEF DESCRIPTION OF THE DRAWINGS

The same numbers are used throughout the drawings to reference like elements and features.

DETAILED DESCRIPTION

Figure 1:
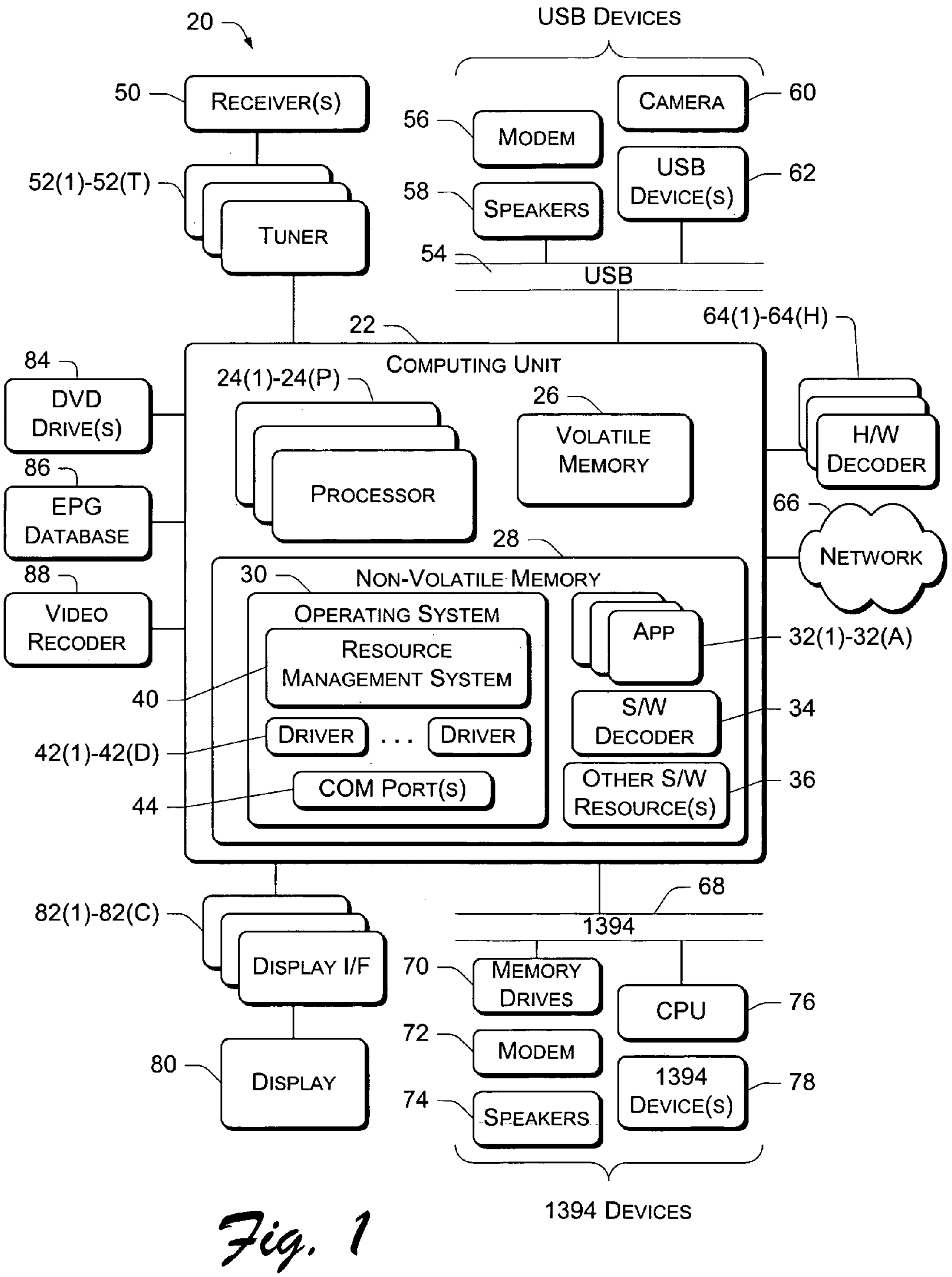
FIG. 1 is a block diagram of an exemplary computing unit in the form of an entertainment computing unit in accordance with one embodiment.

This disclosure describes a resource management architecture for managing resources in a computer system. A resource is a finite quantity of a computing component in the computer system that is utilized to perform various tasks or functions. Examples of resources include hardware devices, ports, CPU processing, memory, USB bandwidth, network bandwidth, software modules, and so forth. A resource may be a physical hardware quantity (e.g., CPU, USB bandwidth, network bandwidth) or an abstract quantity (e.g., virtual memory, audio volume).

Managing limited resources is becoming increasingly important as computer systems are asked to perform more tasks simultaneously, and for multiple users. Consider, for example, a TV-enabled computing system (e.g., broadcast PC, set-top box, etc.) that has a single TV tuner. There may be multiple processes that need to use the TV tuner in order to do their processing. For instance, a TV viewer application needs the TV tuner to provide a video stream that the application displays on a monitor. A TV recorder application might also need the TV tuner to provide a video stream that the application encodes and records on a hard disk for later playback. Unfortunately, the TV tuner can only tune to one TV channel at a time. If there is only one TV tuner in the system, the system is forced to choose between watching a show or recording a show as it cannot do both at the same time (unless both applications want to tune to the same TV channel).

In another situation, perhaps multiple applications concurrently require bandwidth on a Universal Serial Bus (USB). One application might specify bandwidth requirements that consume 20% of the existing USB bandwidth, while another might specify bandwidth that would consume 15%. Further suppose that a combined bandwidth, if all requests were met, would exceed the available USB bandwidth. In this scenario, one or more of the applications might be prevented from gaining access to the USB resource and/or be allocated less than the requested amount.

Among other features, various embodiments of the resource management architecture described herein have the following characteristics:

- Allocates resources based on relative priorities (ultimately as set by the end-user defined policies).
- Dynamically allocates and deallocates resources.
- Allows resources to be reclaimed from a lower priority resource consumer in favor of reassigning them to a higher priority consumer.
- Provides automatic notifications to consumers when additional resources become available.
- Allows resources to be added (registered) and removed (unregistered) dynamically.
- Provides a mechanism for detailed reporting of resource conflicts.
- Allows multiple resources to be acquired automatically.
- Allows dynamic changes to the priority of activities.
- Allows dynamic changes to the ranking of resource configurations.
- Provides a framework such that any third party can register a resource to be exposed.
- Provides a resource-agnostic framework in which any consumer and resource pair can negotiate properties unique to them.
- Allows resource allocation to be done in advance of the actual need for resource usage (resource scheduling).
- Provides mechanisms to prevent consumers from using resources without first reserving them.
- Allows a consumer to specify a range of configurations, ranking them from most desirable to least desirable.
- Provides mechanisms to automatically release resources when the process abnormally terminates while holding resources, thereby preventing resource leaks.
- Allows for legacy applications to co-exist with the resource management architecture.

The resource management architecture may be implemented in many diverse environments and computing contexts. For discussion purposes, the architecture is described in the context of a computing system for the consumer entertainment environment, which might take the form of a broadcast-enabled personal computer, a set-top box (STB), or a game console. After describing one suitable system for implementing the resource manager architecture, the architecture is explored in greater detail with reference to FIG. 2 under the heading "General Resource Management Architecture".

Exemplary System

FIG. 1 shows an entertainment computing system 20 having a computing unit 22 and multiple peripheral components that connect or otherwise interface with the computing unit 22. The computing unit 22 has one or more processors 24(1), 24(2), . . . , 24(P), volatile memory 26 (e.g., RAM), and non-volatile memory (e.g., ROM, Flash, hard disk, CD ROM, etc.).

An operating system 30 is stored in non-volatile memory 28. The operating system 30 is a multi-tasking operating system that, when loaded into volatile memory 26 and executed on one or more processors 24, supports simultaneous execution of multiple applications 32(1), 32(2), . . . , 32(A). One preferred operating system is a Windows-brand operating system sold by Microsoft Corporation. It is noted, however, that other operating systems may be employed.

Applications 32(1)-32(A) are representative of many diverse types of application programs that may be run on the entertainment computing system 20. Examples include an EPG (Electronic Programming Guide) program, browser, channel navigation, audio and video players, audio/video recording program, stereo program, games, audio/video teleconferencing, and so forth. A software decoder 34 (e.g., an MPEG software decoder) and other software resources 36 are also shown stored in non-volatile memory 28.

The operating system 30 has a resource management system 40 that manages the resources of the entertainment computing system 20 for allocation to the applications 32(1)-32(A). The resource management system 40 may be implemented separately from the operating system 30, but is illustrated as being integrated within the operating system. The resource management system 40 is described below in more detail with reference to FIG. 2.

The operating system 30 also has multiple software drivers 42(1), . . . , 42(D) for various associated peripheral components in the computing system 20. One or more COM (communication) ports 44 are also illustrated as being part of the operating system 30. A representative collection of peripheral components is illustrated surrounding the computing unit 22. The entertainment computing system 20 has one or more receivers 50 to receive broadcast data, such as television programming and the like. The receiver(s) 50 may be an analog television receiver, a digital broadcast receiver (e.g., satellite dish, cable modem), an RF receiver, and so forth. The receiver(s) 50 are coupled to one or more tuners 52(1)-52(T) which tune to frequencies of the carrier signals transporting the data.

A USB bus 54 is connected to the computing unit 22 to interface many different kinds of USB compatible peripheral components. Examples of such components include a modem 56, speakers 58, a still or video camera 60, and other USB devices 62.

One or more hardware decoders 64(1), 64(2), . . . , 64(H) are coupled to the computing unit 22 to decode various types of data streams. Exemplary decoders include video decoders, which use such standards as MPEG-1, MPEG-2, MPEG-4, H.261, and H.263, and audio decoders.

The computing unit 22 is coupled to a network 66 to interface with other computers. The network 66 is representative of many diverse types of networks, including LANs, WANs, Internet, intranets, and wireless networks. One of the resources managed by the resource management system 40 is the bandwidth afforded at any given time by the network 66.

A 1394 serial bus 68 is connected to the computing unit 22 to interface many different kinds of 1394 compatible peripheral components. Examples of such components include memory drives 70 (e.g., disk drive, tape drive, CD ROM drive, etc.), modem 72, speakers 74, a CPU (central processing unit) 76, and other 1394 devices 78. It is noted that although USB and 1394 buses are shown in this exemplary system, other bus architectures may be additionally or alternatively used, such as SCSI, ISA (Industry Standard Architecture), and PCI (Peripheral Component Interconnect) buses.

The entertainment computing system 20 has a display 80, which may be a television set or a computer monitor. The display is interfaced with the computing unit 22 via one or more display interfaces 82(1), 82(2), . . . , 82(C), which are representative of a video port, overlay, and video memory.

Other exemplary peripheral devices coupled to the computing unit 22 include DVD player 84, an EPG database 86, and a video recorder 88. The EPG database 86 holds the programming information that fills the tiles of the EPG user interface (UI). The programming information includes such items as program title, start time, duration, actor/actress, summary description, and so forth. The EPG information is received via normal means (e.g., via cable modem or embedded within the vertical blanking interval) and stored in the EPG database 86. The computing unit 22 runs queries on the EPG database to locate shows or other programming content, and presents the information to the user in a graphical UI.

The video recorder 88 may be in the form of a video cassette recorder, a disk-based recorder, and the like. The computing unit 22 can direct the video recorder 88 to record various programming received via the tuners 52 or over the network 66.

In addition to the entertainment-focused components described above, it is further noted that the computing system 20 may also be configured as a fully functional computer that can perform typical desktop applications familiar to computers. A variety of different applications can be loaded and executed on the system, such as word processing applications, spreadsheet applications, database applications, scheduling applications, financial applications, educational applications, and so forth.

The collection of components illustrated in FIG. 1 shows exemplary types of resources that are managed by the resource management system 40. Among them are ports, tuners, decoders, USB bandwidth and devices on the USB bus, network bandwidth, 1394 devices, display interfaces, recorders, memory drives, and so on. Many other components may be added to the system, and one or more of the illustrated components can be removed.

General Resource Management Architecture

Figure 2:
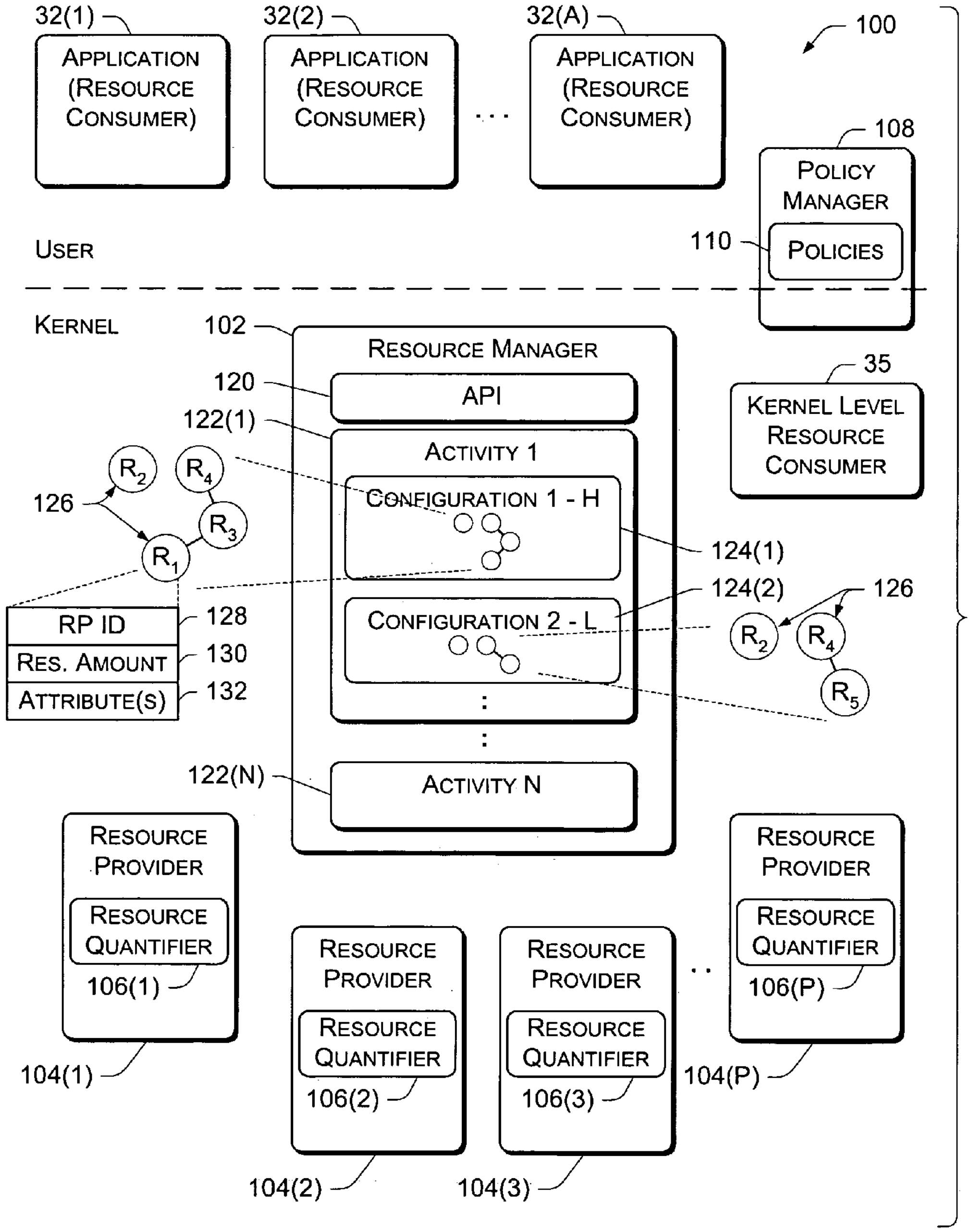
FIG. 2 is a block diagram of an exemplary resource management architecture that is implemented by the computing unit of FIG. 1.

FIG. 2 shows one exemplary resource management architecture 100 that is implemented by the entertainment computing system 20 of FIG. 1. The architecture 100 is implemented in software, and in this example, includes components at the user level as well as components at the kernel level.

The architecture 100 has a resource manager 102 and multiple providers 104(1), 104(2), 104(3), . . . , 104(P), which support one or more resource consumers. Examples of resource consumers include user-level resource consumers, such as applications 32(1), 32(2), . . . , 32(A) and kernel-level resource consumers, such as resource consumer 35. Each provider 104(1)-104(P) is associated with a resource and tracks the availability of the resource. As noted above, a resource is a finite quantity of a computing component in the computer system that is utilized to perform various tasks or functions. Accordingly, examples of resource providers include drivers that own hardware devices (e.g., such as a driver for TV tuner, a USB driver that owns bandwidth on the bus, a CPU scheduler for CPU time resource), hardware components (e.g., decoders), and software modules (e.g., software decoders). It is further noted that a single driver may provide multiple resources, in which case the resource manager 102 sees the driver as multiple providers. Although the resource providers are illustrated at the kernel level, one or more resource providers may also be implemented at the user level.

Each provider 104 has a resource quantifier 106 that determines the amount of resource available for allocation by the resource manager 102. The resource quantifier 106 is configured to calculate the availability in different ways depending upon how the quantity of any given resource is measured. One way is to keep a finite count. For instance, a resource quantifier 106 for a provider of tuning resources may be implemented as a counter that identifies how many tuners are free to be used.

Another way to calculate resource availability is as a percentage. A resource quantifier 106 for a provider of network resources may be implemented to compute the percentage of bandwidth currently available for use. A time-based metric may also be used to calculate resource availability. An example of this metric is a resource quantifier for a CPU that identifies how much processing time the CPU can currently offer. Other ways of calculating the availability of given resources can, of course, be used.

Each resource provider 104 registers itself with the resource manager 102 and supplies a set of callbacks used by the resource manager 102 to get information. For example, one callback is used to perform the resource calculations and another is used to notify the provider of successful reservations.

The resource manager 102 arbitrates access to the resources (local or remote) provided by the resource providers 104. Resource consumers, such as applications 32, request sets of one or more resources provided by the providers 104, and the resource manager 102 determines which applications get to use which resources of the providers. The resource manager 102 makes resource allocation decisions based on a predetermined conflict resolution mechanism. In one implementation, the conflict resolution mechanism is priority based, and hence the resource manager 102 arbitrates access to resources based priority. In another implementation, the conflict resolution mechanism may be based on load balancing which attempts to maximize the number of activities that can proceed at any given time.

A separate and independent policy manager 108 may optionally be implemented to set policies with respect to the conflict resolution mechanism being used by the resource manager. For instance, if the resource manager is employing a priority based resolution, the policy manager 108 ranks tasks a priori according to their relative importance ascribed by the user or system so that the resource manager may determine which task should get access to resources when there is a conflict such that not all tasks can be allocated their resources. Other viable policies include first reservations win, most recent reservations win, "fair" sharing of resources, user picks what wins over what, and so forth. Many different policies are possible.

The system or user sets the policies 110 and the policy manager 108 translates them into absolute priorities. The resource manager 108 may be implemented with components at both the user level and the kernel level.

Generally speaking, a resource consumer is any entity that requires resources to perform a task. As noted above, applications 32 are one example of a resource consumer. As another example, resource providers may themselves be consumers of other resources. For purposes of discussion, applications are assumed to be the primary consumers and hence the description references applications 32 as requesting and consuming resources. This should not be taken as a limitation to the architecture, however, as other types of consumers may be utilized.

The resource manager 102 exposes a defined API (application program interface) 120 to interact with other modules in the architecture. The API 120 includes a set of provider API calls used by the providers 104 and a set of consumer API calls to accept requests for resources from the applications 32(1)-32(A) or other resource consumers. One API is described below in detail under the heading "Resource Manager API".

When an application 32 wants to perform a task, it uses the API 120 to create an activity 122 at the resource manager 102 and build one or more configurations 124 describing various sets of resources required to perform the activity. An activity is a data structure associated with a task being performed in the system. One activity exists per task being performed. In FIG. 2, activities 122(1), . . . , 122(N) are illustrated at resource manager 102. The resource manager 102 decides which activities can be satisfied in their entirety from the limited pool of resources and allows the applications with activities that can be satisfied to have access to the requested resources.

A configuration is a data structure holding a collection of one or more resource descriptors 126 for corresponding resources needed to perform a task in the system. The activity data structure is a container that holds one or more configurations. In FIG. 2, two configurations 124(1) and 124(2) are shown within the first activity 122(1). The first configuration 124(1) contains four descriptors $R_1$, $R_2$, $R_3$, and $R_4$ to identify corresponding resource providers that control the resources required to perform the task and to specify the amounts of those resources that are needed. The second configuration 124(2) contains three descriptors $R_2$, $R_4$, and $R_5$ to identify corresponding resource providers that control the resources required to perform the task and to specify the amounts of those resources that are needed. The activity 122(1) can successfully complete its task with any one of the configurations 124.

Each resource descriptor 126 represents an instance of a resource required by a resource consumer to perform a task. It contains the following information: (1) an identity field 128 to hold the identity of the resource provider 104 that owns the resource; (2) an optional amount field 130 to hold the quantity of resource needed for that configuration; and (3) an attribute field 132 to list one or more resource attributes. The amount held in field 130 is opaque to the resource manager, and is a value that only needs to be understood by the provider and consumer. Similarly, an attribute is other data that only the provider and consumer understand, but is opaque to the resource manager. In the context of tuners, for example, a resource attribute might be the tuner frequency that a resource consumer wants.

Each application might specify one or more configurations for each activity, as illustrated by two configurations 124(1) and 124(2) for activity 122(1). Configurations may be added to an activity at any time, regardless of whether the activity has resources reserved. If multiple configurations are specified, the application ranks them according to a preference or desirability level and the resource manager 102 attempts to satisfy the most desirable configuration. Here, the first configuration 124(1) is identified as being more preferred or having a higher desirability, as indicated by the "H". The second configuration 124(2) is identified as being less preferred or having a lower desirability, as indicated by the "L".

With multiple configurations, the resource manager 102 is able to flexibly and dynamically change from one configuration for an application to another as the operating conditions change. For instance, if resources are needed elsewhere by a higher priority application, the current application may be asked to use a less preferred or "fallback" configuration that enables the needed resources to be reallocated to the higher priority application. When those resources subsequently become available again, the resource manager 102 can notify the application so that the application can request to upgrade to the preferred configuration. Dynamically changing to a fallback configuration and upgrading to a more preferential configuration are described in more detail below under the headings "Fallback Configuration" and "Upgrade Notification".

The resource descriptors 126 may be organized as a tree to represent any inherent reliance among the resources. That is, a resource provider in turn consumes resources from other providers. For example, a USB camera driver is a provider of the camera resource and a consumer of bandwidth provided by the USB bus driver. Such relationships are represented as a tree of resource descriptors.

In the tree metaphor, the configuration 124 can be thought of as the root of the descriptor tree. In FIG. 2, there are four resource descriptors 126 in the first configuration 124(1) that are organized in a tree. The tree contains two side-by-side sibling nodes $R_2$ and $R_4$ to represent that the resources provided by the corresponding resource providers are both required to perform the requested task. A child node $R_3$ branches from descriptor $R_4$ to indicate that the provider referenced by $R_4$ is a consumer of the resource referenced by descriptor $R_3$. Similarly, node $R_1$ branches from descriptor $R_3$ to indicate that the provider referenced by $R_3$ is a consumer of the resource referenced by descriptor $R_1$.

General Operation

Figure 3:
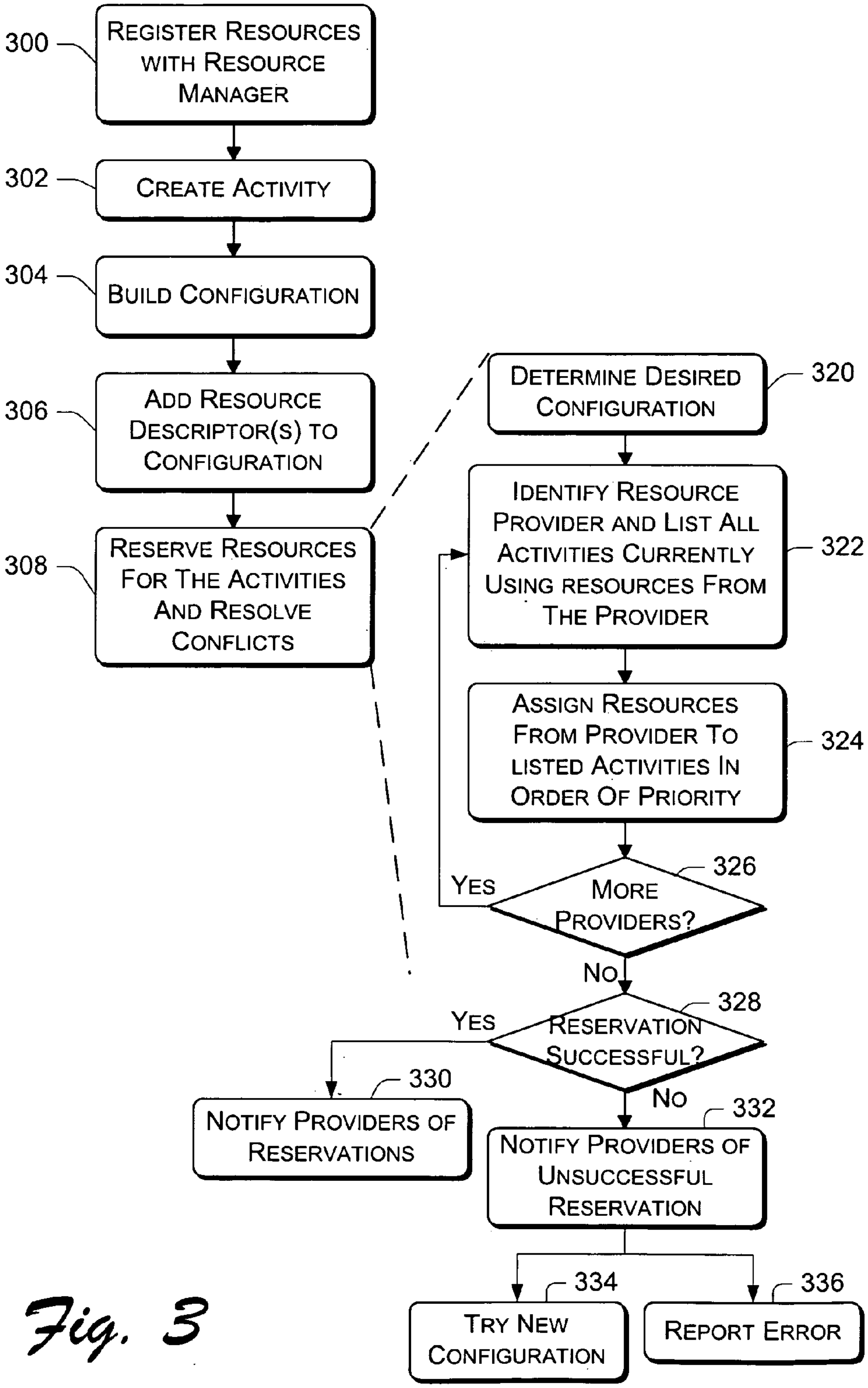
FIG. 3 is a flow diagram that describes steps in an exemplary resource management method that is implemented by the FIG. 2 resource management architecture.

FIG. 3 shows the general operation of the resource management architecture 100 in accordance with the described embodiment. The process is performed in software and will be described with additional reference to FIG. 2.

At step 300, each of the resource providers 104(1)-104(P) register the resources it manages with the resource manager 102. Registration (and unregistration) can occur at any time. Each resource provider 104 uses a function call "RmRegisterResource" in the resource manager API 120 to register its resource with the resource manager 102. Each resource has an associated type specific GUID (Globally Unique IDentifier) to identify the type of resource, and this GUID is passed in as part of the function call. A single provider 104 can register multiple types. Similarly, multiple providers can register for the same resource type.

As part of the registration process, the resource provider 104 specifies a set of callbacks that the resource manager 102 will use to reserve and release resources on behalf of a consumer. The RmRegisterResource process returns a handle to be used in other calls into the resource manager.

According to the architecture 100, consumers go through the resource manager 102 only to reserve and release resources. Otherwise, the consumers directly access the resource provider 104 to add appropriate resource descriptors to a configuration and to use the resources once they are reserved, as described below in more detail.

At step 302, a resource consumer creates one or more activities to perform one or more associated tasks. As an example, suppose application 32(1) creates an activity 122 (1) in resource manager 102. The application 32(1) uses a function call "RmCreateActivity" to register the activity with the resource manager 102. This process creates the container data structure forming the activity 122(1) and produces an activity handle for the activity 122(1).

At step 304, the resource consumer builds one or more configurations within each activity. If more than one configuration is specified, the resource consumer ranks each configuration in the activity in terms of desirability within the scope of that activity. In the FIG. 2 example, application 32(1) builds at least two configurations 124(1) and 124(2) within the first activity 122(1) using the function call "RmCreateConfiguration". This process produces a handle to the configuration structures 124(1) and 124(2).

Once the configurations 124 are created, the resource consumer starts adding, via associated providers, the resource descriptors to the configurations (step 306 in FIG. 3). In the FIG. 2 example, application 32(1) begins adding descriptors, such as $R_2$ and $R_4$, to the first configuration 124(1) using corresponding resource providers 104. The providers 104 utilize a function call "RmAddResourceToConfiguration" from the resource manager API to add the descriptors to the configurations. As descriptors 126 are added, their corresponding resource providers 104 may call other providers (usually lower in the stack) to add dependent resource descriptors. Here, the resource provider identified by descriptor $R_4$ calls the resource provider identified by descriptor $R_3$, which in turn calls the resource provider identified by descriptor $R_1$.

At step 308, the consumer contacts the resource manager to reserve resources for an activity. The resource manager, in turn, contacts the resource providers and reserves resources, if available, on behalf of the consumers. The resource manager attempts to reserve every resource identified in the descriptor configuration tree. If resources are not available, the resource manager arbitrates among the activities and resolves conflicts as to which consumer(s) are granted access to the resources. The consumer can utilize the allocated amount of resources until either the consumer voluntarily relinquishes the resources or until the resources are pre-empted by the Resource Manager.

One implementation of the reservation and arbitration step 308 is illustrated as substeps 320-330. At step 320, a consumer specifies which configuration 124 in the activity 122 to reserve. If no configuration is specified, the resource manager 102 attempts to reserve the configurations in order of desirability. In our continuing example, the application 32(1) uses a function call "RmReserveResources" to direct the resource manager 102 to reserve the resources specified in the preferred configuration 124(1). This configuration 124(1) requires resources from providers identified by descriptors $R_1$, $R_2$, $R_3$, and $R_4$.

At step 322, for each resource descriptor 126 in the configuration, the resource manager 102 identifies the corresponding resource provider 104 and makes a list of all activities 122 in the system that currently are using resources from this resource provider. The activity 122(1) to be reserved is also added to this list. The resource manager 102 assigns resources to all descriptors contained in the listed activities (step 324) using a provider supplied "resource allocation" function. In a priority-based scheme, the activities in the list have associated priorities and the resource manager 102 starts with the highest priority activity when assigning resources. The resource manager 102 iterates through the list of activities until it reaches the end or the provider runs out of resources. A more detailed description of an exemplary resource calculation is given below in the next section, under the heading "Exemplary Resource Reservation Calculation".

A configuration is said to be reserved when all the resource descriptors in it are reserved. A resource descriptor is said to be reserved when resources are assigned to it. Steps 322 and 324 are repeated for every resource/resource provider in the configuration (step 326).

At step 328, the resource manager 102 determines whether each reservation is successful in that all requested resources are available. If the reservation succeeds, the resource manager 102 notifies the resource providers 104 of the reservation so that they can validate consumer requests to use the resources (step 330). In this manner, the providers 104 can catch rogue consumers as well as legitimate consumers that attempt to use resources without first reserving them. For instance, a legitimate program might attempt to use a CPU resource without first reserving it. Likewise, a USB mouse will use USB bandwidth without first having reserved it. In such situations, the providers associated with the CPU and USP bandwidth will be able to discern that the program or USB mouse has not yet reserved the resources.

If the reservation fails (meaning that all requested resources are not available), the resource manager 102 notifies the resource providers 104 of the reservation failure (step 332). The resource manager 102 then performs one or both of the following tasks: (1) try a less preferred configuration, if one is available and the consumer did not specify a configuration to reserve (step 334), and/or (2) report an error to the requesting consumer.

Exemplary Resource Reservation Calculation

Figure 4:
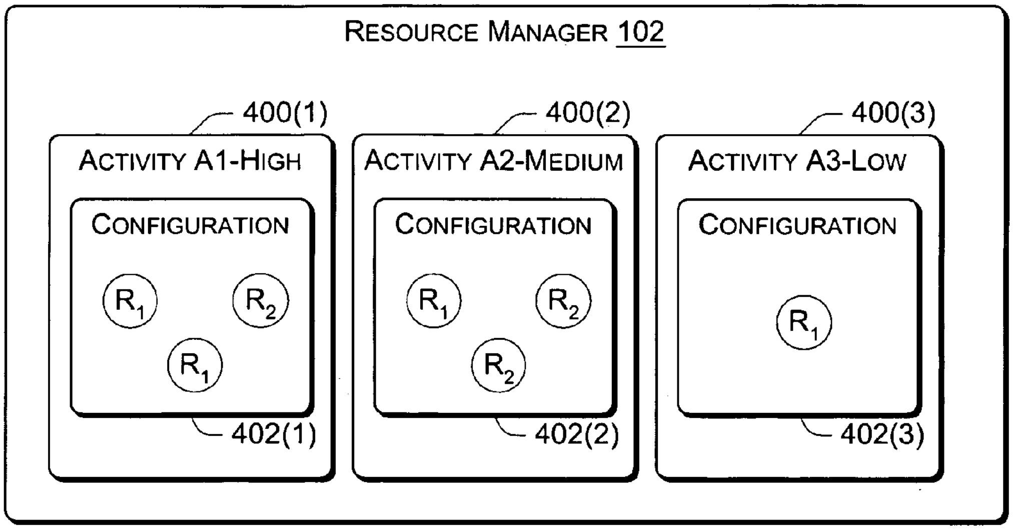
FIG. 4 is a block diagram that illustrates an exemplary resource reservation process in accordance with the described embodiment.

FIG. 4 illustrates an exemplary resource reservation process employed as part of the reservation and arbitration step 308 (more particularly, steps 322-326) in FIG. 3. In step 308 of FIG. 3, the resource manager 102 reserves resources on behalf of the consumers, such as applications 32. FIG. 4 shows three activities A1, A2, and A3, which are generally referenced by numbers 400(1), 400(2), and 400(3). The activities are constructed and reside at the resource manager 102. Each of the activities has an associated priority, whereby the first activity A1 has the highest priority, the second activity A2 has the medium priority, and the third activity A3 has the lowest priority (i.e., A1>A2>A3).

The "priority" of an activity indicates a user or system preference. It is not used in the sense of a traditional thread or process priority. Specifically, an activity priority defines an arbitration policy between consumers contending for the same resources. In the described implementation, the policy manager 108 assigns priorities to each of the activities. Notice that the priorities are assigned to an activity as opposed to individual resources. In this manner, the resource manager can reclaim resources from lower priority activities to satisfy the reservation request of a higher priority activity.

In this example, each activity 400(1)-400(3) has only one configuration 402(1)-402(3). Descriptors $R_1$ and $R_2$ represent corresponding resource providers that have registered with the resource manager. Activities A1 and A2 have both descriptors $R_1$ and $R_2$, whereas activity A3 has only descriptor $R_1$. For this example, assume that the highest and lowest priority activities A1 and A3 are reserved and the resource manager gets a request to reserve the medium priority activity A2. The resource manager performs the following five steps to reserve A2.

Step 1: The resource manager goes through its internal states and makes an activity list of all activities that are reserved (i.e., step 322 of FIG. 3). At this point, the list contains the reserved activities A1 and A3. The resource manager then adds the activity A2 to the list and sorts the resulting list in descending order of priority. This results in an activity list containing, in order, the highest priority activity A1, followed by the medium priority activity A2, followed by the lowest priority activity A3.

Figure 5:
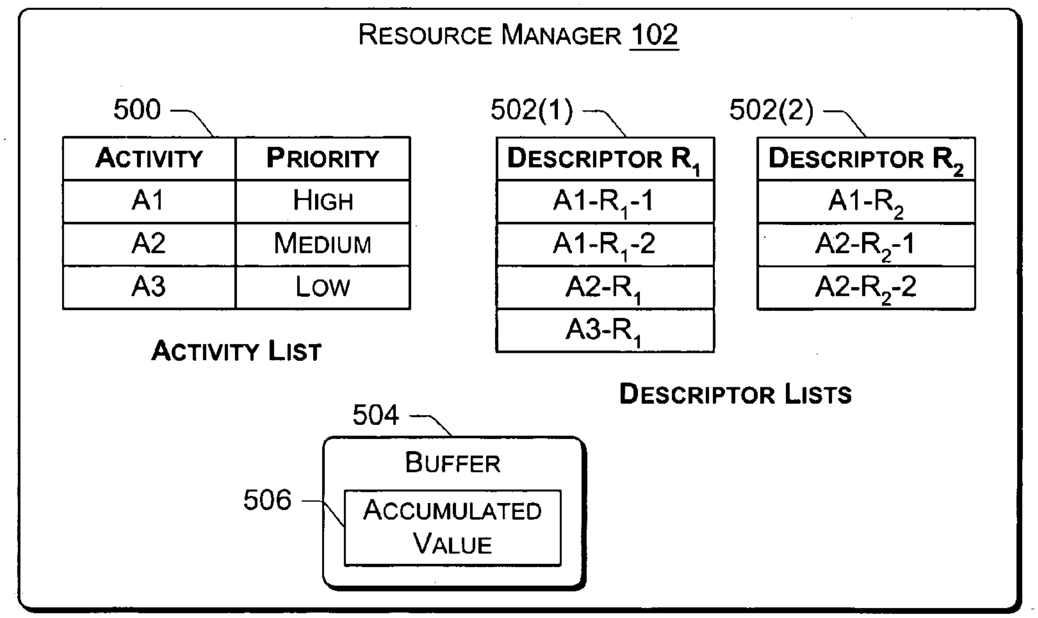
FIG. 5 is a block diagram that illustrates different exemplary structures that are utilized in a resource reservation process in accordance with the described embodiment.

FIG. 5 shows an activity list 500 showing the three activities in order of priority. The activity list 500 is maintained at the resource manager.

Step 2: For each resource descriptor in activity A2, the resource manager determines if there are sufficient resources to satisfy the request, thereby allowing the resource manager to reserve the resource descriptor for the activity. This is done by first making a list of resource descriptors in all activities in the activity list 500 that use the same provider as referenced by the resource descriptor that is to be reserved. For example, to reserve A2-$R_1$ (i.e., the descriptor $R_1$ in Application A2), the resource manager constructs a separate resource descriptor list of all resource descriptors $R_1$ in activities listed in the activity list 500. The list is also in descending order of priority.

FIG. 5 shows two descriptor lists 502(1) and 502(2). The first list 502(1) contains all resource descriptors $R_1$ in the activities A1-A3 listed in the activity list 500, in descending order of priority: A1-$R_1$-1, A1-$R_1$-2 (i.e., a second use of provider $R_1$ in activity A1), A2-$R_1$, and A3-$R_1$. The second list 502(2) contains all resource descriptors $R_2$ in the activities A1-A3 listed in the activity list 500, in descending order of priority: A1-$R_2$, A2-$R_2$-1, and A2-$R_2$-2. The descriptor lists 502 are maintained at the resource manager.

Step 3: After the descriptor lists 502 are completed, the resource manager creates a buffer 504 that holds an accumulated value 506 representing the increasing amount of resources allocated to various activities. For each element in the $R_1$ descriptor list 502(1), the resource manager calls the resource provider $R_1$'s "add accumulator" function and passes in the resource descriptor (i.e., A1-$R_1$-1, A1-$R_1$-2, etc.), the accumulator buffer 504 and the resource provider's resource quantifier 106 (FIG. 2). The resource manager makes similar calls for each element in the $R_2$ descriptor list 502(2).

The add accumulator function determines the resource amount required for the resource descriptor and adds it to the contents of accumulator buffer 504. If the new value in buffer 504 exceeds the maximum amount of resources in the resource provider $R_1$, the add accumulator function returns an error indicating that the provider cannot satisfy this allocation due to shortage of resources. The resource manager tags the activity associated with such resource descriptors as "victims." For example, if the calculation on resource descriptor A3-$R_1$ fails, activity A3 is tagged as victim. If the activity being reserved, A2, is marked as a victim, the resource manager bails out to step 332 of FIG. 3, noting that it is not possible to reserve the configuration in activity A2.

Step 4: After processing all resources descriptors in the resource descriptor lists constructed in Step 2, the resource manager evaluates if there are any victim activities. If there are no victim activities, the resource manager was able to successfully reserve the activity A2. The providers of all resource descriptors in A2 are notified of the new reservation. This allows providers to validate a consumer's request to access a resource; conversely, it can catch rogue consumers that attempt to use resources without reserving.

Step 5: On the other hand, if there are victim activities at the end of step 3, the resource manager notifies those activities to release the resources. When the resources are released, the resource manager assigns them to the activity that originally made the request (A2 in this case). For instance, suppose that activity A3 is tagged as a victim in step 3. The resource manager notifies the activity A3 to release its resources and reallocates them to the requesting activity A2. This makes sense because the activity A2 has a higher priority than activity A3 and thus, the limited resources should be shifted from the lower priority activity A3 to the higher priority activity A2.

Resource Allocation Using Priority-Based Preemption

The resource management architecture 100 shown in FIG. 2 may employ different types of strategies to allocate resources among the various activities being requested by resource consumers. For instance, one strategy might be to optimize resources among as many activities as possible. Another strategy is to allocate resources according to some priority criteria. It is this latter strategy that is of interest in this section.

A priority-based strategy allocates resources based upon which applications and/or users have priority over others to use the resources. Again, the term "priority" is not used in the sense of a traditional thread or process priority, but in the context of an arbitration policy between consumers contending for the same resources. Priorities are assigned to an activity as opposed to individual resources.

The priority-based strategy permits activities to be ranked by importance, e.g., activities that are more "important" to the user could be designated to have higher priority. This allows the resource management architecture to migrate desired, but limited, resources away from the less important activities to the more important activities. Determining what constitutes "more important" and "less important" is the venue of the policy manager 108 and the policies 110, and this is described below in more detail under the heading "Policy Manager". For the present discussion on preemption, however, it is assumed that there is some priority rating that ranks activities in some manner, such as their relative importance to other activities. As an example, in the absence of a policy manager 108, the activity priorities may be assigned in a first come, first served basis.

With priority-based preemption, the resource manager effectively "preempts" the lower priority activity that is currently using the resources and dynamically shifts the resources to the higher priority activity. The resource manager notifies the lower priority activity that its right to use the resources is suspended. This gives the lower priority activity an opportunity to stop using the resources in a controlled, clean manner, or alternatively, a chance to react and possibly complete its processing in an alternative manner.

The resource manager in cooperation with the application from which the resource is reclaimed accomplishes the preemption process. As shown in FIG. 2, the resource manager 102 maintains one or more activity structures 122 that are assigned a priority within the system. Each activity has one or more configuration structures 124 that specify a set of resources the activity needs to accomplish its task. The resource manager 102 also tracks which activities have been granted resources for their configurations and maintains communication with each resource provider 104 maintains the communication needed with each resource provider 104 and the state needed for each resource provider to track how much of the resource they provide is currently available.

Figure 6:
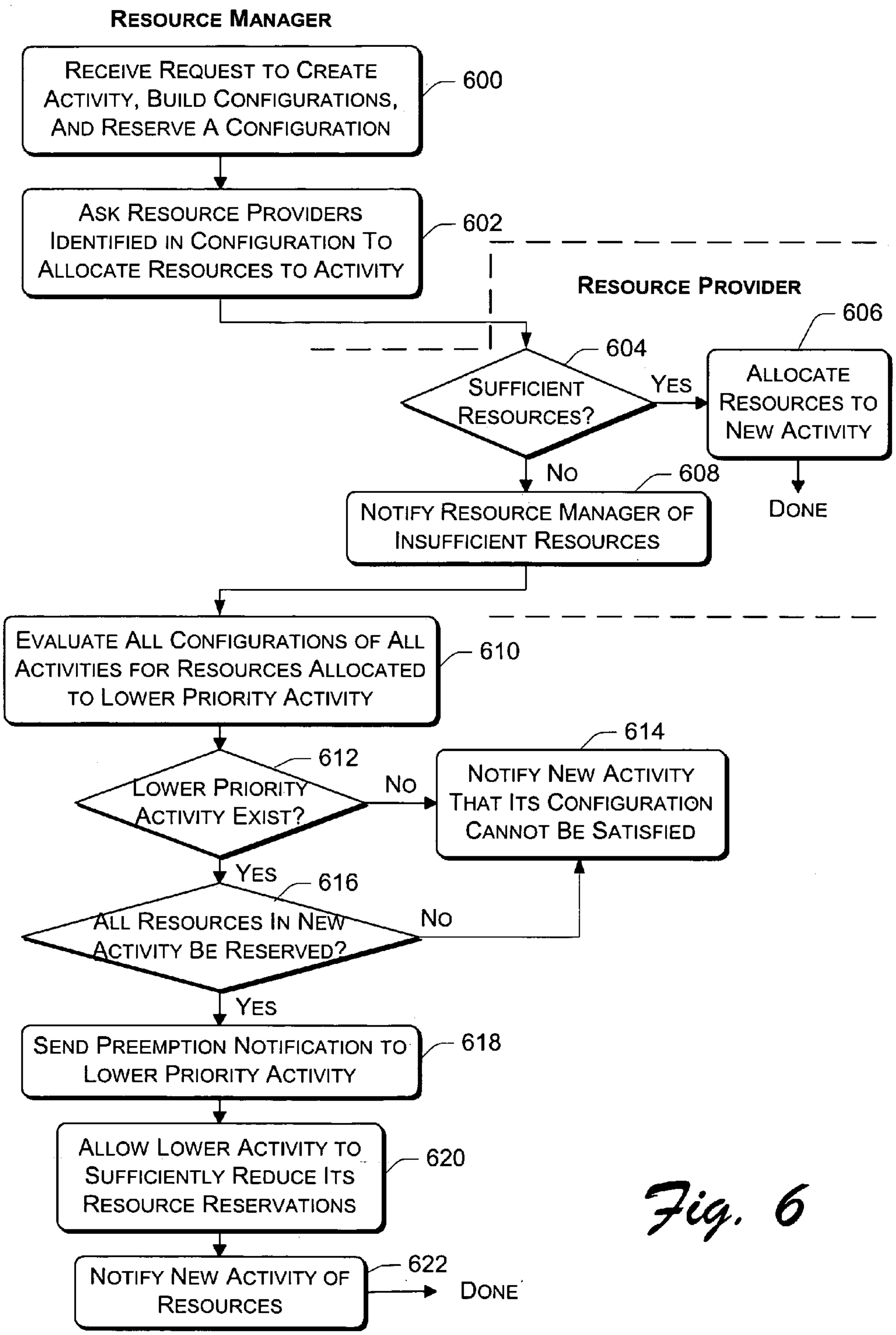
FIG. 6 is a flow diagram that describes steps in a resource allocation method using priority-based preemption in accordance with the described embodiment.

FIG. 6 shows the resource allocation process using priority-based preemption. The steps are performed in software by the resource manager and resource providers (as illustrated graphically), and are described with additional reference to FIG. 2.

At step 600, the resource manager 102 receives a request from a consumer (e.g., application) to create an activity 122 for performing a certain task. One or more configurations 124 are designated as part of the activity. The consumer then reserves a configuration. The resource manager 102 asks each registered resource provider 104 identified in the configuration 124 to determine whether it can allocate its resource to the activity 122 (step 602).

If the providers 104 have sufficient resources to satisfy the new configuration, the resource manager allocates the resources to the activity (i.e., the "yes" branch from step 604 and step 606). Otherwise, if any provider 104 does not have sufficient resources left to satisfy the configuration, it notifies the resource manager 102 of this lack of resources (i.e., the "no" branch from step 604 and step 608).

The resource manager 102 checks all configurations 124 of all activities 122 with a lower priority than the one currently requesting resources to determine if any lower priority activity is currently using resources that, if reallocated to the new higher priority activity, would satisfy the configuration of the higher priority activity (step 610). If no such lower priority activity, or combination of lower priority activities, exists (i.e., the "no" branch from step 612), the resource manager 102 notifies the higher-priority activity that its configuration of resources cannot be currently satisfied (step 614).

On the other hand, if a lower priority activity exists from which resources can be taken (i.e., the "yes" branch from step 612), the resource manager 102 determines whether all resources in the new higher-priority activity, including those resources currently reserved in the lower priority activity, can be reserved (step 616). If not (i.e., the "no" branch from step 616, the resource manager 102 notifies the higher-priority activity that its configuration of resources cannot be currently satisfied (step 614). Conversely, if the resources can be reserved, the resource manager 102 sends a preemption notification informing each of the lower priority activities that it must give up its resources (step 618). The lower priority activities are then given an opportunity to reduce its resource reservations in a controlled manner to free of resources for reallocation to higher priority activities, or alternatively, a chance to react and possibly complete its processing in an alternative manner (step 620). When all lower priority activities have released all resources they are currently using, the resource manager 102 notifies the new, higher priority activity that it can proceed to allocate the resources it needs (step 622). In this manner, the lower priority processes are preempted of their use of limited resources that are needed by higher priority processes.

It is noted that in the event that a lower priority process does not willingly give up its resources upon receiving the preemption notice from the resource manager, the resource manager is capable of revoking the activity's reservations and/or terminating the process associated with the lower priority activity and forcibly reclaiming its resources.

FIGS. 7-10 show different scenarios to illustrate resource allocation using priority-based preemption. Each figure shows one or more activities that exist at the resource manager 102 and the attempt to add one more activity. Each of the existing and new activities has an associated priority. For ease of discussion, each activity is assumed to have only one configuration.

Figure 7:
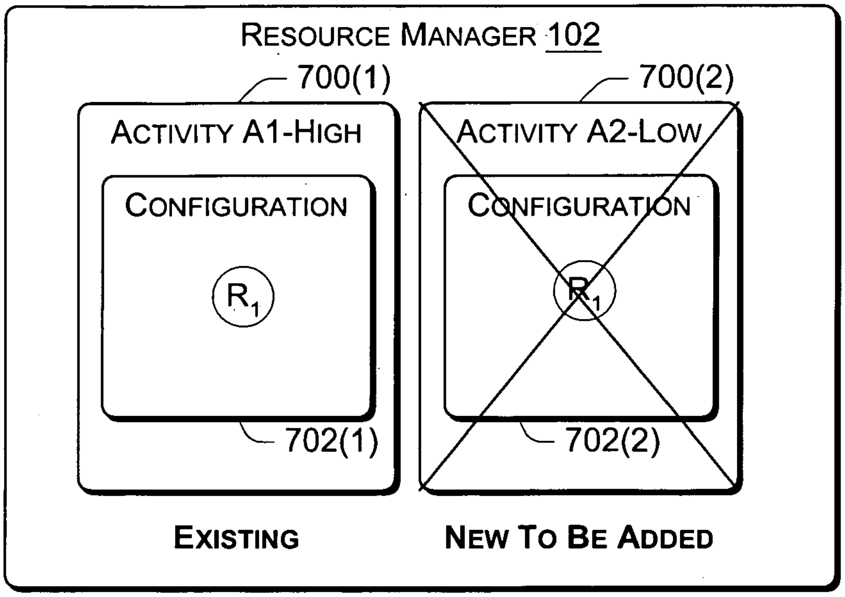
FIGS. 7-10 are block diagrams that illustrate different scenarios for resource allocation using priority-based preemption in accordance with the described embodiment.

FIG. 7 illustrates the case where two activities wish to utilize the same resource, but unfortunately, the resource can only be allocated to one of the two activities. For example, suppose the resource is a tuner and the system only has one tuner. The two activities A1 and A2 (referenced generally by numbers 700(1) and 700(2)) have corresponding configurations 702(1)-702(2), each with the identical descriptor to represent the same corresponding resource provider.

In the FIG. 7 case, the existing activity A1 has the highest priority and the new activity A2 seeking to be added has the lowest priority (i.e., A1>A2). According to the priority-based preemption process of FIG. 6, the resource manager runs the "resource calculation" on A1 first by contacting the resource provider identified by descriptor $R_1$. As described in the "resource calculation" method earlier, the provider adds the amount of resource required by this descriptor to the accumulator. The new value of accumulator becomes 1. The provider compares the accumulator value to the total amount of resources it has (1 in this case) and indicates to the resource manager it can satisfy the amount. The resource manager repeats this same protocol for activity A2 with the "accumulator" initialized to 1. The provider adds the amount of resources required for activity A2 (step 602 in FIG. 6) to contents of the accumulator and finds it exceeds the total amount of resources that it has. The resource provider returns a notice that it cannot satisfy the request given its current allocation (steps 604 and 608). The resource manager then evaluates whether there is any lower priority activity that is currently using the requested resource (step 610). In this case, the current user of the resource is the existing activity A1, which has a higher priority than that of the new activity A2. Accordingly, the resource manager informs the new activity that its configuration cannot be satisfied at this time (steps 612 and 614).

Figure 8:
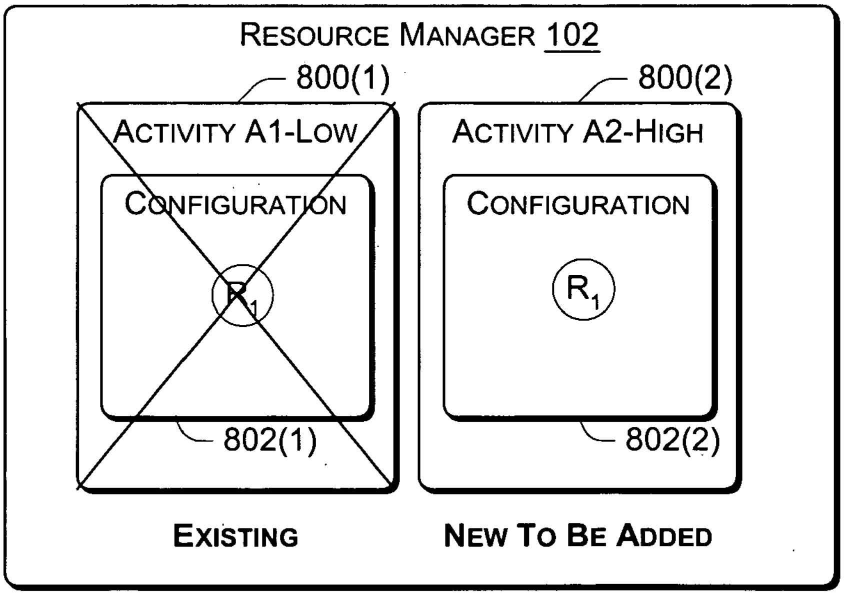

FIG. 8 illustrates a similar case to that of FIG. 7, except that the new activity has a higher priority than the existing activity. The two activities A1 and A2 (referenced generally by numbers 800(1) and 800(2)) have corresponding configurations 802(1)-802(2), each with a descriptor to represent a corresponding resource provider. In this case, the existing activity A1 has a lower priority than the new activity A2 (i.e., A1<A2).

According to the priority-based preemption process of FIG. 6, the resource manager asks the resource provider identified by descriptor $R_1$ to determine whether it can allocate resources to the new activity A2 (step 602 in FIG. 6). The resource provider returns a notice that it cannot satisfy the request given its current allocation (steps 604 and 608).

The resource manager then evaluates whether there is any lower priority activity that is currently using the requested resource (step 610). In this case, the current user of the resource is the existing activity A1, which has a lower priority than that of the new activity A2. Accordingly, the resource manager sends a preemption notice to the lower priority activity A1 (steps 616) and allows the lower priority activity to stop or complete (step 618). The resource manager informs the new, higher-priority, activity A2 that it will be allocated its requested resources (step 620). Accordingly, FIG. 8 represents the case where the resource manager dynamically migrates resources from an existing activity to a new activity, thereby victimizing the existing activity for the sake of a higher priority new activity.

Figure 9:
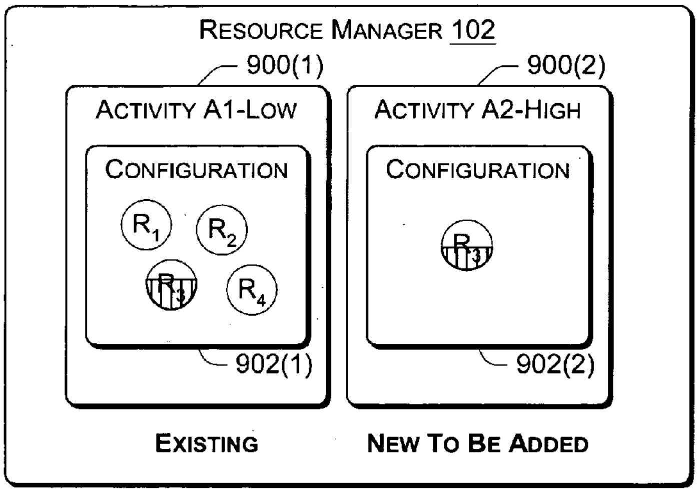

FIG. 9 illustrates a case where the victim activity is asked to release or reduce its usage of a resource. In this case, the victim activity is currently reserving other resources $R_1$, $R_2$, and $R_4$, which have not been requested by the resource manager. In such a case, the consumer that owns the activity can decide whether to release all of the resources, release all of the resource required by the resource manager, or release a portion of the resource required by the resource manager. For discussion purposes, suppose the resource $R_3$ pertains to the CPU resource, and the consumer associated with activity A1 desires to reduce its usage of the CPU to 40% usage in response to a request from activity A2 for 50% of the CPU.

In FIG. 9, an existing low-priority activity A1 (referenced generally as number 900(1)) has a corresponding configuration 902(1), with four resources represented by descriptors $R_1$-$R_4$. A new high-priority activity A2 (referenced generally as number 900(2)) has a corresponding configuration 902(2), with only one resource $R_3$. The resource manager determines that the higher-priority activity A2 has rights to the resource identified by descriptor $R_3$ and preempts the activity A1. In this case, the victim activity A1 elects to reduce it usage of the resource identified by descriptor $R_3$ and maintains control of the remaining resources identified by descriptors $R_1$, $R_2$, and $R_4$, at least for the time being.

Figure 10:
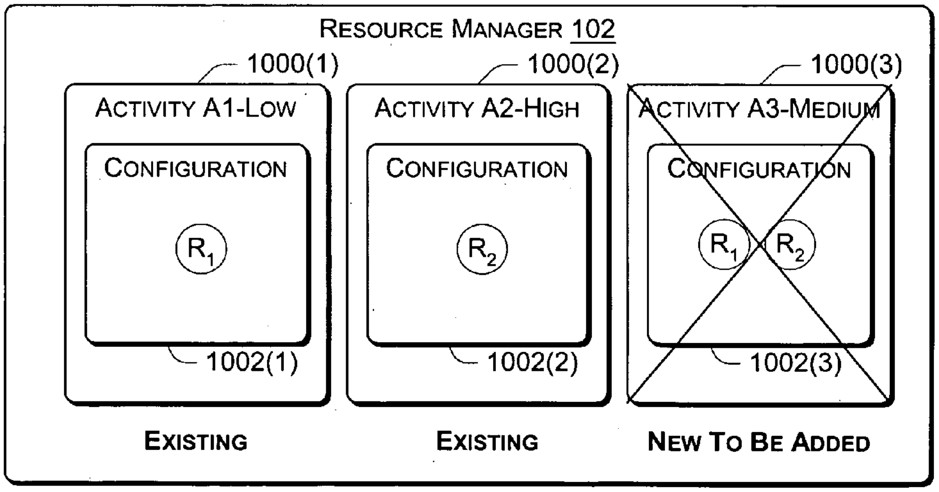

FIG. 10 illustrates a case where the resource manager considers whether it can satisfy an entire configuration of a new configuration prior to embarking on a course of preempting existing lower-priority activities. FIG. 10 shows an existing low-priority activity A1 (i.e., 1000(1)) with a configuration 1002(1) that lists a single descriptor $R_1$. Another existing, but high-priority, activity A2 (i.e., 1000(2)) has a configuration 1002(2) listing a single descriptor $R_2$. A third activity A3 (i.e., 1000(3)) with a medium priority requests to be added. The third activity A3 has a configuration 1002(3) that lists two descriptors $R_1$ and $R_2$.

In this case, the resource manager must allocate the resources identified by the two descriptors $R_1$ and $R_2$ to satisfy the request of new activity A3. The resource manager could preempt the low-priority activity A1 to permit reallocation of the resource identified by descriptor $R_1$ to the medium-priority activity A3, but this would only satisfy one resource. The resource manager further determines that the current user of the other resource $R_2$ is the high-priority activity A2. Hence, the resource manager would not preempt the higher-priority activity in favor of the medium-priority activity. Since the resource manager cannot satisfy the entire configuration of new activity A3, the resource manager opts not to preempt the low-priority activity A1 and instead notifies the consumer associated with the new activity A3 that its request cannot be satisfied.

Fallback Configuration

The scenarios described in the preceding section assumed that the activities had only one configuration. However, as illustrated in the general resource management architecture of FIG. 2, each activity may specify multiple configurations. With multiple configurations, there may be a situation in which the activity is preempted from using a resource, but may still continue processing using another configuration that does not require the preempted resource. Accordingly, a flexible adaptive process may be able to complete its task in some alternate manner, using an alternate set of resources. For example, instead of using a hardware video decoder (a resource that is reallocated to a higher priority activity), the activity might alternatively employ an algorithm that uses a software video decoder.

The alternate configurations may utilize different resources, which may not be in conflict, or simply fewer resources. Usually, use of an alternate configuration leads to a degradation in the quality of results produced by the application. In this situation, the activity is said to "fallback" from a more preferred configuration to another, less preferred configuration. For instance, when an activity dynamically changes from a preferred configuration having a hardware video decoder to a fallback configuration having a software video decoder, the fallback configuration cannot decode to a full-screen sized image. The output of the application is thus degraded in quality to a reduced-size video image on the monitor.

With reference to FIG. 2, the resource management architecture 100 facilitates flexible adaptation of activities 122 when resource allocations are changed. Each activity 122 can contain multiple configurations 124(1), 124(2), etc., where each configuration represents an acceptable set of resources so that the process can make progress if it has all of the resources in the configuration. The configurations 124 are ranked in order of preference by the application or consumer process. When the resource manager 102 preempts an activity, the activity is required to release or reduce usage of its resources. After the resources are freed up, there are several possible courses of action. In one approach, the consumer associated with the preempted activity can ask the resource manager to reserve resources of another configuration. Another approach is for the resource manager 102 to automatically attempt to reserve resources in the next-highest-ranking fallback configuration. The resource manager continues successively through each fallback configuration until (1) finding a configuration that can be satisfied with the currently available resources, or (2) discovering that no fallback configuration can be satisfied.

Figure 11:
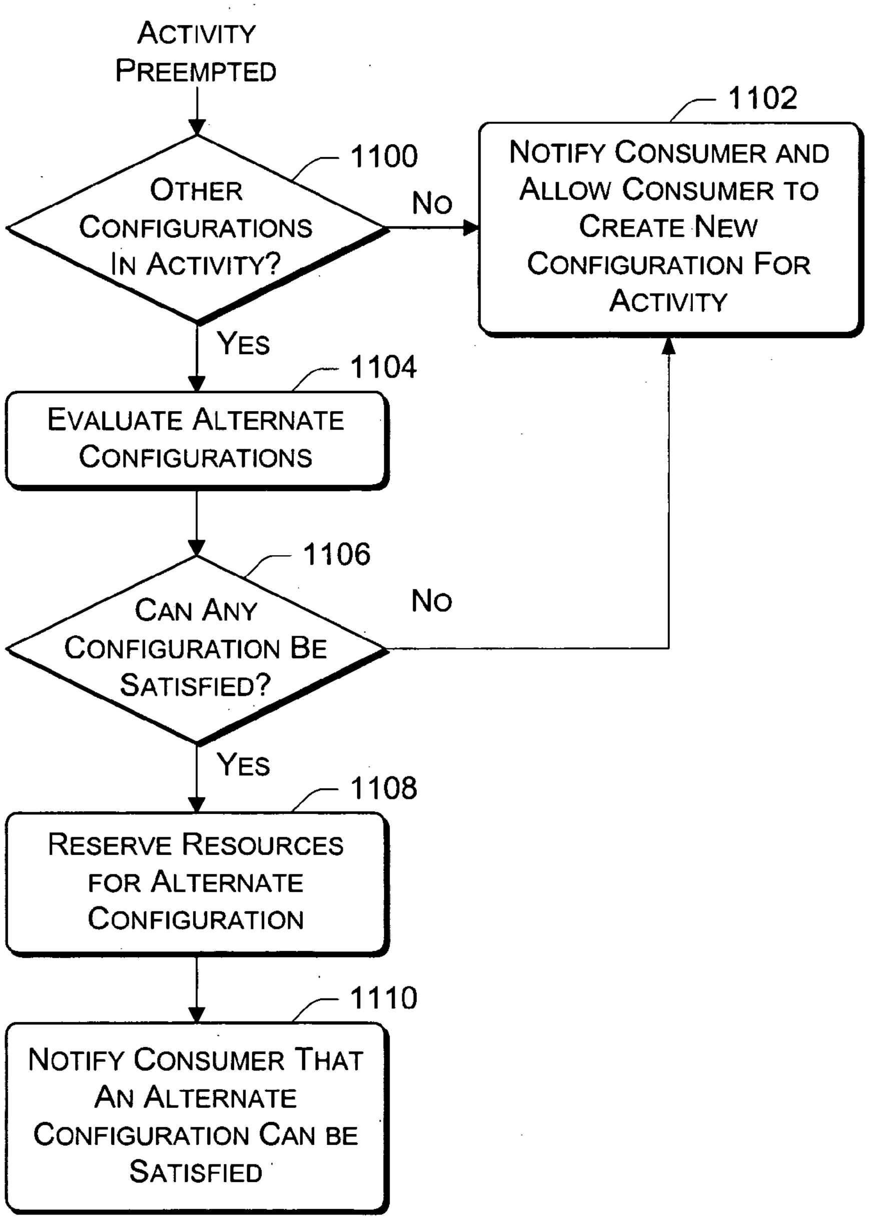
FIG. 11 is a flow diagram that describes steps in a method for dynamically downgrading from a more preferred configuration to a less preferred configuration in accordance with the described embodiment.

FIG. 11 illustrates a process for dynamically downgrading from a more preferred configuration to a less preferred configuration as operating conditions change. Such change might be induced, for example, as a result of the priority-based policy in which the resource manager 102 preempts a low-priority activity in favor of reallocating the resources to a high-priority activity. The steps in FIG. 11 are implemented by the resource manager 102 and will be described with additional reference to FIG. 2. The depicted process assumes that the resource manager 102 has preempted an activity's use of one or more resources as a result, for example, of the resource allocation process shown in FIG. 6. Thus, the victim activity no longer has its preferred configuration available.

At step 1100, when the resource manager 102 preempts an activity, the resource manager 102 determines whether the victim activity 122 has another configuration 124. If no other configuration is specified in the activity container 122 (i.e., the "no" branch from step 1100), the resource manager notifies the consumer (e.g., application 32) that no alternative configurations are specified and gives the consumer an opportunity to create a new configuration in the activity that describes a fallback set of resources and to request reservation of the new configuration (step 1102). Configuration creation is described above with reference to FIG. 3.

Alternatively, if one or more other configurations are noted in the activity (i.e., the "yes" branch from step 1100), the resource manager 102 proceeds through all fallback configurations 124 in the activity 122 (step 1104). The resource manager 102 determines whether any of the fallback configurations can be satisfied (step 1106). If no configuration can be satisfied (i.e., the "no" branch from step 1106), the resource manager notifies the consumer and gives the consumer an opportunity to create a new configuration in the activity (step 1102).

Conversely, if at least one of the fallback configurations can be satisfied (i.e., the "yes" branch from step 1106), the resource manager 102 reserves the resources in that configuration (step 1108). The resource manager 102 also notifies the consumer that the fallback configuration can be satisfied (step 1110). The notification takes place in such a way that if any non-preempted resource is in both the current configuration and the fallback configuration, or if the preempted resource is in both the current and the fallback configurations with the fallback configuration using a smaller quantity of the preempted resource than the current one, the process can switch configurations without freeing that resource.

The fallback process of FIG. 11 supports three different approaches. In one approach, the alternate configuration may not be created until the consumer is notified that its current configuration is being preempted. This is demonstrated by step 1102 in FIG. 11. At this point, the consumer (e.g., application 32) creates a new configuration without the conflicted resource(s) and tells the resource manager 102 to add the alternate configuration to the activity and reserve the alternate configuration. It may take some time to construct the alternate configuration, and communication with the resource manager (and indirectly with the providers) may take time as well. This time delay may impact quality.

If all the resources in the fallback configuration are available, the resource manager 102 reserves the fallback resources and, if the consumer so desires, release the original resources. Alternatively, the consumer may temporarily own the union of the two configurations and explicitly release the original resources later. If the fallback configuration cannot be satisfied, the resources in the original configuration are not released to let the process try again with yet another fallback configuration. Eventually, if the consumer cannot create an acceptable fallback configuration, it stops processing and releases the resources for reallocation to another activity. The consumer then waits until the resources become available again.

A variant on the first approach is where the consumer, on receiving its notification, explicitly notifies the resource manager that it can free the resources that have been preempted. In this way, the resources may get freed a bit sooner than waiting until the consumer is able to build its fallback configuration.

In another approach, the alternate configurations are created in advance by the resource consumer. This is illustrated by the "yes" branch from step 1100 in FIG. 11 and by the multiple configurations 124(1) and 124(2) in one activity 122(1) in FIG. 2. As part of preemption, the resource manager 102 simply notifies a preempted consumer that it is losing its current configuration in the activity and must switch to the given fallback configuration. Prior to this notification, the resource manager reserves the resources in the fallback configuration, thus the consumer temporarily owns the union of the two configurations. The consumer then frees the contested resource and makes necessary changes to support the alternate set of resources. The resource manager 102 then releases the resources in the original configuration that are not in the fallback configuration so that those resources may be reallocated to other activities.

It is noted that fallback configurations can also be used during initial reservation of resources. For example, when an application 32 supplies multiple configurations 124 in an activity 122, ranked by merit, the resource manager 102 picks the highest-ranking configuration that it can satisfy and reserves those resources and notifies the process which configuration was fulfilled.

Figure 12:
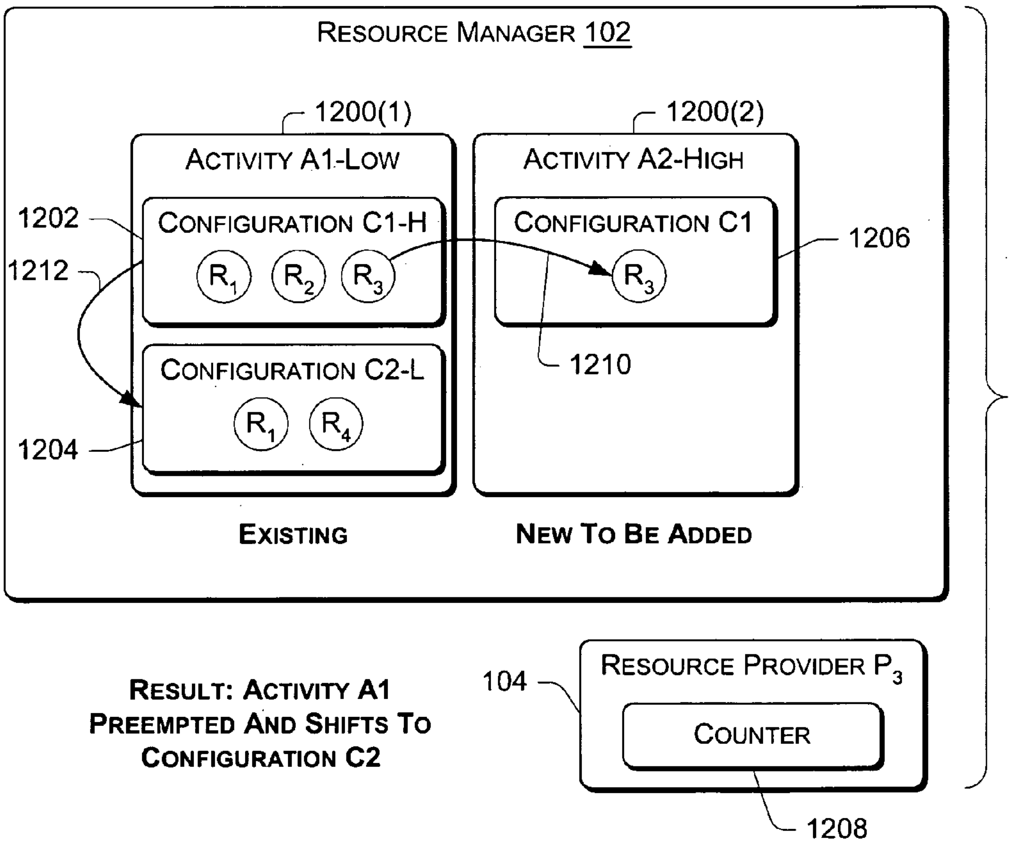
FIG. 12 is a block diagram that illustrates one scenario in a method of downgrading to a less preferred configuration in accordance with the described embodiment.

FIG. 12 illustrates one scenario in a process of downgrading to a less preferred configuration. FIG. 12 shows an existing activity A1 (referenced as number 1200(1)) and a new activity A2 (referenced as number 1200(2)) residing at the resource manager 102. The new activity A2 has a higher priority than that of the existing activity A1.

The existing activity A1 has two configurations: a preferred configuration C1 (referenced as number 1202 and marked with a letter "H" to designate it as being higher ranked), and a fallback configuration C2 (referenced as number 1204 and marked with a letter "L" to designate it as being lower ranked). The preferred configuration C1 contains a set of resources descriptors $R_1$, $R_2$, and $R_3$ to identify corresponding resources needed to perform the activity. The fallback configuration C2 contains a different set of resources descriptors $R_1$ and $R_4$ to identify corresponding resources needed to perform the activity. The new activity A2 has one configuration C1 (referenced as number 1206), which contains one descriptor $R_3$ to identify the corresponding resource.

In this illustrated example, resource descriptor $R_3$ identifies a resource provider $R_3$, referenced as number 104. Assume that the resource provider $R_3$ controls a resource that can only be allocated once, such as a tuner. Furthermore, assume that the counter 1208 maintained by the resource provider $R_3$ indicates that the sole tuner is currently allocated to the existing configuration C1 of the lower-priority activity A1.

When the resource manager 102 receives a reservation request from the consumer that created the new activity A2, the resource manager 102 learns that the resource provider 104 cannot allocate resources to the other activity, A1, any more. Thus, the resource manager determines that it should preempt the lower-priority activity A1 to shift the resource associated with descriptor $R_3$ to the higher-priority activity A2.

The resource manager determines whether the lower-priority activity A1 has an alternate configuration (i.e., step 1100 in FIG. 11). In this case, activity A1 has a fallback configuration C2 that does not require the preempted resource controlled by provider $R_3$. Thus, the resource manager 102 reserves the resources in the fallback configuration C2 (i.e., resources provided by provider $R_1$ and $R_4$) and notifies the consumer associated with activity A1 that it is being preempted and needs to switch to the fallback configuration C2 (i.e., steps 1108 and 1110 in FIG. 11).

The activity A1 shifts to using the fallback configuration C2, as represented by arrow 1212. The resource manager 102 reallocates the resource of provider $R_3$ from the activity A1 to the new activity A2, as represented by arrow 1210.

Hopefully, the impact to the consumer associated with activity A1 will be minor and the process may continue without disruption resulting from the conversion to the fallback configuration C2. For example, consider the situation described above where the hardware video decoder is lost, but can be replaced by a software decoder. The application may have a way to load and initialize the software video decoder and then integrate it into the video stream in a manner such that the video stream is not interrupted.

The difference between configurations in the activities may vary widely. It may be that the original and alternate configurations have a great deal in common with respect to the resources required. Indeed, the difference may be only in that the resource in conflict is removed from the alternate configuration. Alternatively, the configurations may be quite different.

Upgrade Notification

In the preceding section, the consumers in the system may be required to move to a less desirable configuration in the event they are preempted from a more desirable configuration. Upgrade notification involves the return trip by allowing consumers to upgrade to a more desirable configuration when resources once again become available.

Figure 13:
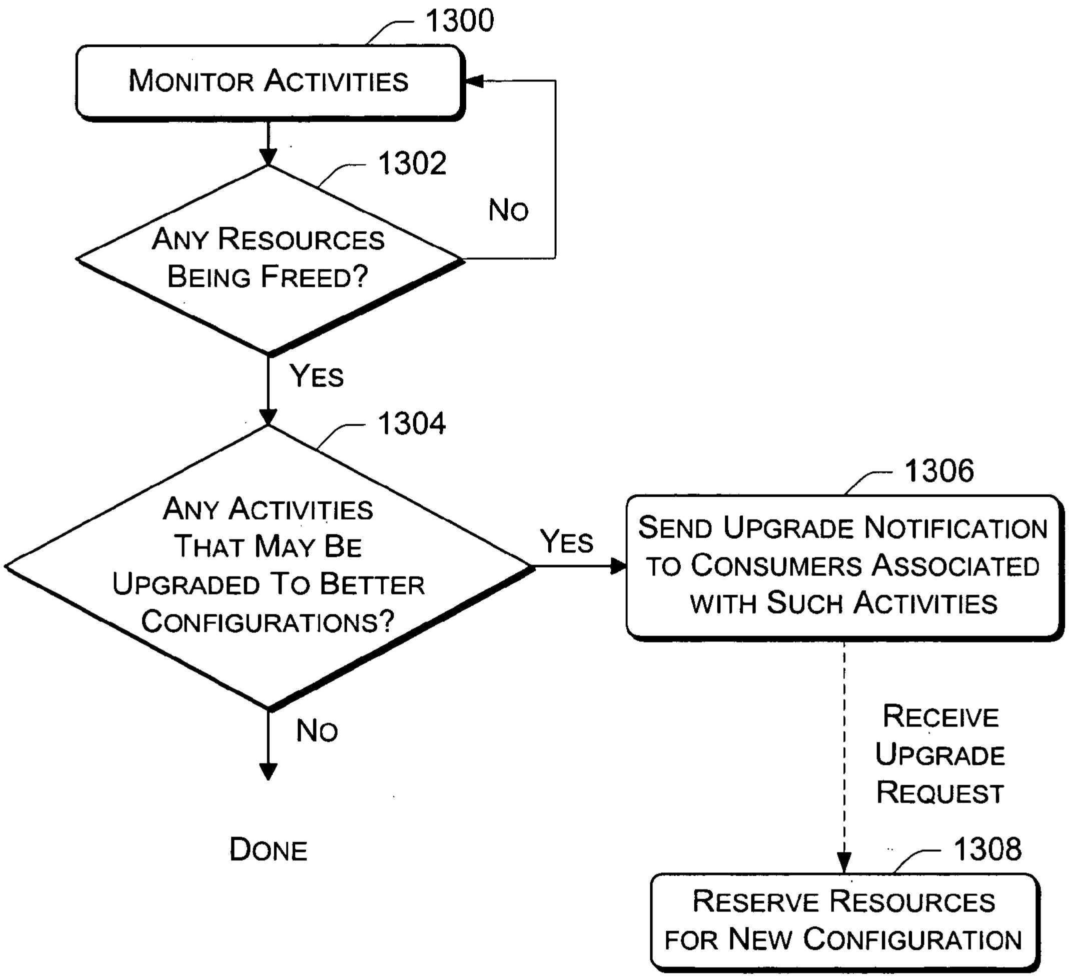
FIG. 13 is a flow diagram that describes steps in a method for dynamically upgrading from a less preferred configuration to a more preferred configuration in accordance with the described embodiment.

FIG. 13 illustrates a process for dynamically upgrading from a less preferred configuration to a more preferred configuration as operating conditions change. The process is implemented at the resource manager, and will be described with reference to FIG. 2. The depicted process assumes the application is running in a less desirable configuration because the application was either (1) unable to reserve all of the desired resources in its highest ranking configuration when it initially requested to reserve resources, or (2) previously preempted and moved to a lower-ranking configuration.

At steps 1300 and 1302, the resource manager 102 monitors the existing activities to detect when an activity completes and releases its resources. When resources are freed, the resource manager 102 examines all activities, including activities that currently have no configuration reserved and activities with less-than-best configurations reserved, to determine if it can upgrade to any more preferred configurations (step 1304). If so, the resource manager 102 sends an upgrade notification to the consumers associated with the activities (step 1306). The upgrade notification informs the consumer that a more desirable (i.e., higher ranked) configuration in its activity can be satisfied with currently available resources.

The consumers register with the resource manager to receive upgrade notifications when a more desirable configuration than the one it is currently using becomes available. The upgrade notifications are optional, however, and the consumers need not register to receive them.

When a consumer receives an upgrade notification, the consumer can submit an upgrade request to the resource manager asking to reserve the resources for the new configuration. Upon receiving the upgrade request, the resource manager attempts to reserve the new configuration (step 1308). In one implementation, the resource manager essentially employs the same process as illustrated in FIG. 3, except that the consumer being upgraded is permitted to reserve two configurations for a short time—the configuration it currently owns and the new configuration. Allowing the reservation of two configurations enables a smooth transition from the old configuration to the new configuration. The consumer releases the old configuration after transitioning to the new one. In another implementation, the consumer application being upgraded may be required to first shut down processing with the old configuration and then reserve the new one before resuming processing.

There is no guarantee, however, that the consumer will be successful in reserving the new configuration. For instance, it may be the case that other higher-priority activities are also laying claim to the same resources. The resource manager does guarantee that if the consumer's attempt to upgrade to a more desirable configuration is unsuccessful, the consumer will retain the existing configuration.

It is noted that configurations, including higher ranking or lower ranking ones, may be added to an activity at any time, regardless of whether the activity has resources reserved. If a configuration is added to an activity that currently has resources reserved, and if the configuration is of a higher ranking than the current configuration and the higher ranking configuration can be satisfied, the resource manager will send an immediate upgrade notification informing the consumer that the higher ranking configuration is possible.

Figure 14:
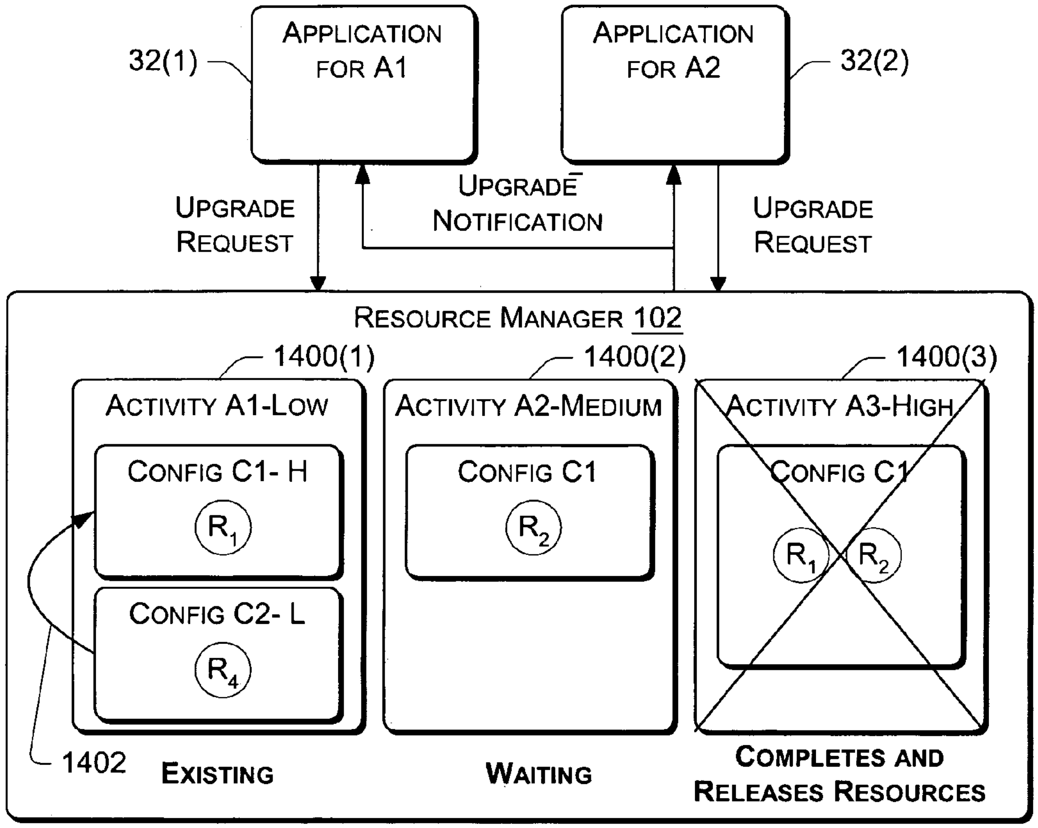
FIG. 14 is a block diagram that illustrates one scenario in a method of upgrading to a more preferred configuration in accordance with the described embodiment.

FIG. 14 illustrates one scenario in a process of upgrading to a more desirable configuration. FIG. 14 shows an existing activity A1 (referenced as number 1400(1)), a waiting activity A2 (referenced as number 1400(2)), and a terminating activity A3 (referenced as number 1400(3)) residing at the resource manager 102. The terminating activity A3 has the highest priority, followed by waiting activity A2, followed by the existing activity A1. The terminating activity A3 has completed its task and is in the process of releasing its resources designated by descriptors $R_1$ and $R_2$.

The medium-priority activity A2 has a single configuration C1 that requires the resource designated by descriptor $R_2$. The medium-priority activity A2 is waiting because it was previously unable to gain access to the resource that was allocated to the higher-priority activity A3.

The existing activity A1 has a preferred configuration C1, which contains a descriptor $R_1$, and a fallback configuration C2, which contains a descriptor $R_4$. The existing activity is currently using the fallback configuration C2, because the resource designated descriptor $R_1$ is currently tied up by the higher-priority activity A3.

When the high-priority activity A3 terminates and releases the resources associated with descriptors $R_1$ and $R_2$, the resource manager 102 determines whether existing activities could benefit from the newly released resources (i.e., steps 1304 and 1308 in FIG. 13). In this case, both activities A1 and A2 could benefit. Thus, the resource manager 102 sends an upgrade notice to the applications 32(1) and 32(2) associated with the activities A1 and A2, respectively (i.e., step 1306). If the applications elect to upgrade, they return upgrade requests. In this example, the resource manager 102 upgrades the configuration of activity A1 from the less preferred configuration C2 to the more preferred configuration C1, which utilizes the released resource designated by descriptor $R_1$. This is represented by arrow 1402. The resource manager also reserves the resource associated with descriptor $R_2$ on behalf of activity A2.

Configuration Building

As mentioned above, resources or resource providers may themselves, in addition to providing a resource, be consumers of other resources that are managed by other resource providers. For example, a USB camera resource is a consumer of bandwidth that is provided by the USB driver. Thus, the USB driver is a dependent resource provider whose parent is the USB camera resource. Yet, when an application asks for the USB camera, it may not be aware that the camera needs to use the services of the USB driver. That is, some resource consumers, such as applications, may not be aware or knowledgeable of all of the dependent resources that it needs to perform a task. These types of resource consumers might only be aware of the "top level" resources that they need to perform their tasks. As an example of this type of resource consumer, consider applications that are written prior to later-developed technology. Specifically, a television application may be written to request only a "tuner resource" from a tuner resource provider. Later developments in tuner technology may make additional tuners available that were not available to the television application when it was originally written. These new tuners may be consumers of resources that themselves may have been developed or improved after the application was written. Yet, when the television application requests a "tuner resource", there needs to be a way to incorporate the new tuner resource and its dependent resources into one or more configurations so that the older application can use the newer tuner. Advantageously, aspects of the described embodiment enable this to be done in a manner in which each of the resource providers is aware of its own resource needs. Hence, when a resource provider is called upon during the configuration building phase, it can take all of the appropriate steps to ensure that dependent resources are adequately represented in the configurations that get built.

Figure 15:
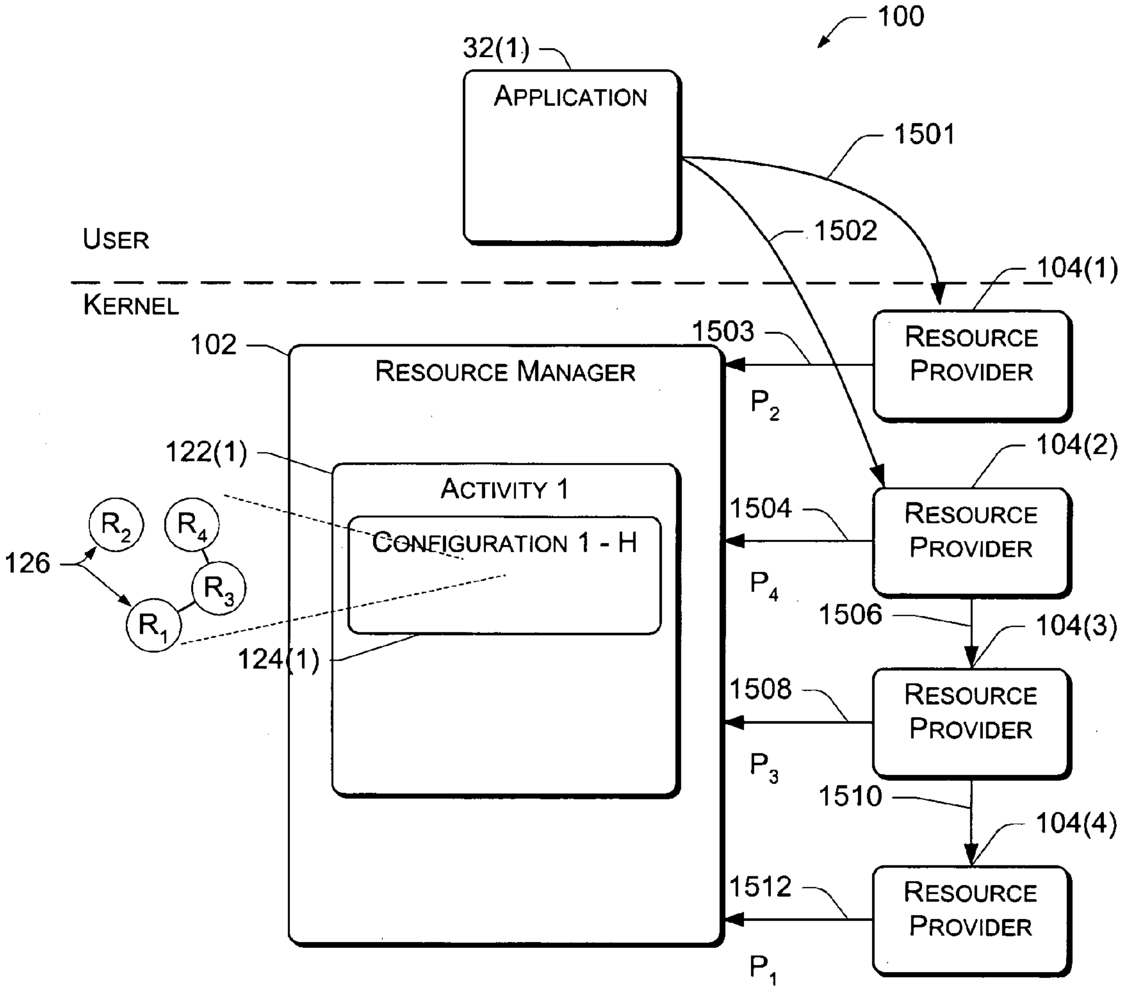
FIG. 15 is a block diagram that illustrates one scenario in a method of building a configuration.

FIG. 15 shows an architecture that illustrates but one way in which resources that are unknown to a resource consumer are nonetheless represented in the configuration that is being built. It should be understood that the description that is provided just below is tailored for the specific case in which a resource consumer is not aware of the dependent resources that are needed to perform a task. It is possible that the resource consumer might be knowledgeable about one or all of the dependent resource providers. In that case, the configuration described just below would be built, for example, through a number of direct calls from the resource consumer to the resource providers. For purposes of this discussion, however, we will assume that such is not the case.

The processing that is described just below takes place after one or more of the configurations have been created, and corresponds to step 306 (FIG. 3). Here, only one configuration 124(1) within one activity 122(1) is illustrated. It should be apparent that multiple configurations within one or more activities could be built. At this point the configuration is unpopulated. When a configuration is populated, one or more resource descriptors are added to the configuration by each of the resource providers that contribute a resource to perform a particular task with which the activity is associated. Each resource descriptor identifies its resource provider, and indicates a quantity of an associated resource that is needed for a particular configuration. In this specific example, only one resource consumer is utilized and comprises an application 32(1).

In the illustrated example, application 32(1) is aware or knows of only a subset of resources (and hence their associated resource providers) that are necessary for it to perform its task. Here, application 32(1) is aware of a first set of resource providers that includes resource providers 104(1) and 104(2). The application 32(1) is unaware and not knowledgeable of a second set of resource providers (i.e. resource providers 104(3) and 104(4)). These resource providers are used by resource provider 104(2) to assist it in performing the task. Each of the resource providers 104(1)-104(4) is configured to call other resource providers when the configuration 124(1) is being populated. Since application 32(1) is aware of certain resource providers, it accordingly calls only those resource providers so that the resource providers can provide information that enables the configuration 124(1) to be populated with resource descriptors that are associated with the resource providers. Those resource providers of which the application 32(1) is unaware are called by other resource providers that use their resources.

For example, in FIG. 15, the application is aware of resource providers 104(1) and 104(2). Hence, when the application is attempting to populate or build a configuration, it directly calls these resource providers (as indicated by the arrows 1501 and 1502). In the described embodiment, function calls are made to the resource providers and identify the activity (e.g. via an activity ID or handle) and a configuration (e.g. via a configuration handle or ID) that is being populated. Responsive to receiving these function calls, each of the resource providers make a function call on the resource manager 102 and provides it with information regarding its associated resource. The resource manager 102 then uses this information to maintain the configuration. In the illustrated example, such information is provided in the form of associated resource descriptors. In this example, each of resource providers 104(1) and 104(2) provide the resource manager 102 with the information required to construct the resource descriptors $R_2$ and $R_4$ respectively. This is indicated by the arrows 1503, 1504 originating with each of the respective resource providers and terminating at the resource manager 102. As the application is unaware, however, of the resource providers 104(3) and 104(4), it does not call them directly. Rather, in this example, the parent resource provider that utilizes their resources calls them. Hence, resource provider 104(2) calls (arrow 1506) resource provider 104(3) and hands it the activity handle and the resource identifier for its resource descriptor in the configuration that is being populated. Responsive to this call, the resource provider 104(3) calls (arrow 1508) the resource manager 102 (as indicated by the communication arrow designated $R_3$) with the information that the resource manager needs to maintain the configuration. This information includes so-called relationship information concerning resource provider 104(2). In this example, the relationship information describes a child/parent relationship that resource provider 104(3) has with resource provider 104(2). Similarly, because resource provider 104(3) uses resources associated with resource provider 104(4), it calls (arrow 1510) resource provider 104(4) with the activity handle and resource identifier for its resource descriptor in the configuration that is being populated. In turn, resource provider 104(4) calls (arrow 1512) the resource manager with information (including relationship information that describes its parent) so that the resource manager can maintain the configuration. This communication is illustrated by the communication arrow designated $R_1$.

In this example, the nature of the parent/child relationship is shown by descriptors 126 that are arranged in and comprise a hierarchical tree that describes the dependent relationships of certain resources. Although the described configuration is in the form of a hierarchical tree, other configurations, including ones that are not necessarily hierarchical in nature could be used, e.g. flat or linear configurations, or configurations that do not describe resource dependencies. It is, however, advantageous to utilize a hierarchical structure in the event that particular conditions occur. Examples of these particular conditions include the failure of a resource reservation, or a preemption of a resource, each of which are discussed in more detail below.

Figure 16:
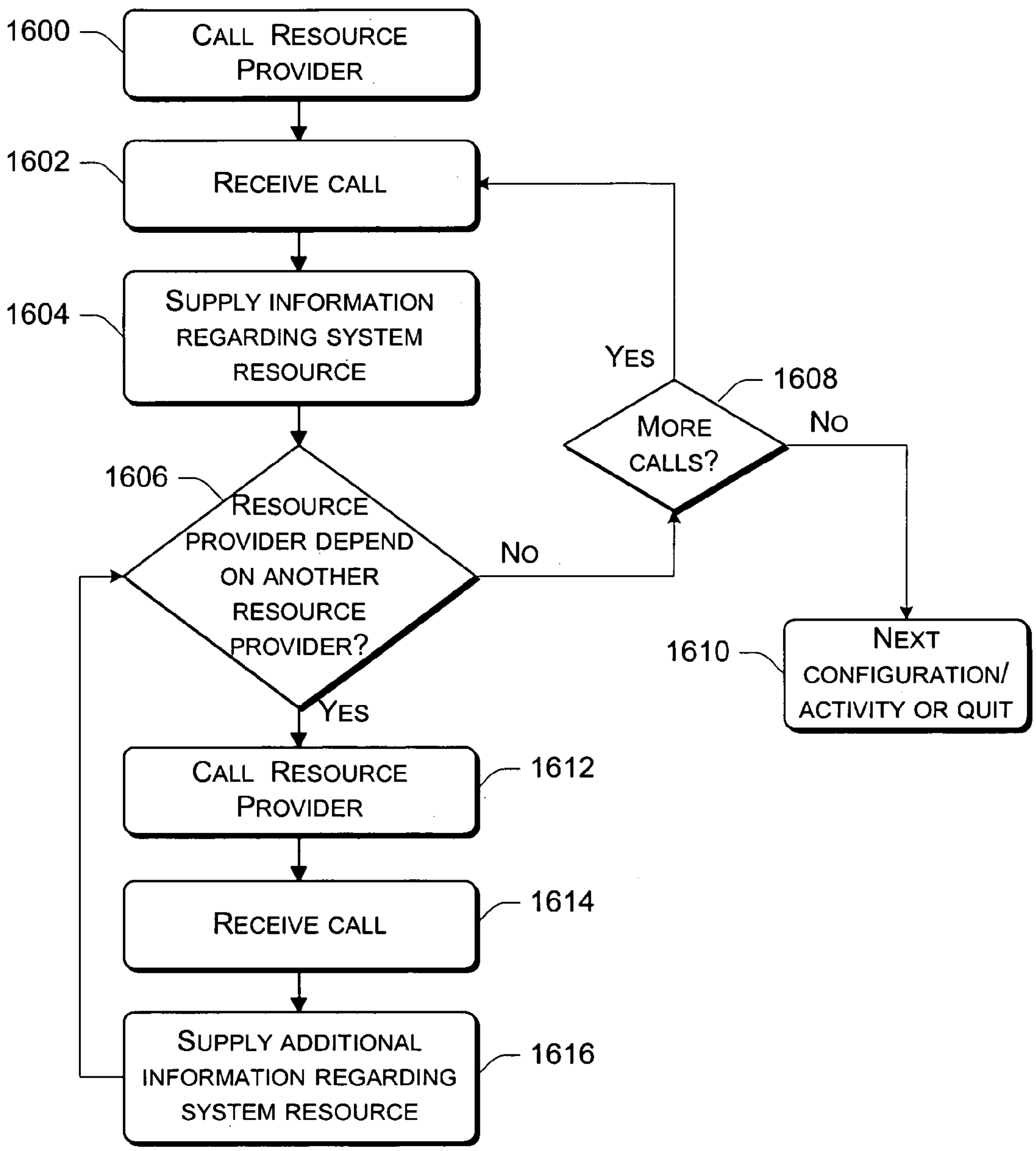
FIG. 16 is a flow diagram that describes steps in a configuration building method in accordance with the described embodiment.

FIG. 16 shows steps in an exemplary resource management method in accordance with the embodiment described just above. Step 1600 calls a resource provider. In the illustrated example, this call is made to an interface that is supported by the resource provider and used when one or more configurations are desired to be built or populated. The call to the resource provider can come from a resource consumer (such as an application or system component), or from another resource provider. Step 1602 receives the call and is responsive thereto, the resource provider supplies information regarding its resource that is utilized to maintain the configuration that is being populated. Step 1606 determines whether the resource provider depends on any other resource providers in order for a task to be performed. In systems where the resource consumer is unaware of dependent resource providers, this determination is made by the individual resource providers. In systems where the resource consumer is aware of dependent resource providers, this determination can be made either by the resource consumer or the individual resource provider. In the example of FIG. 15, the determination for resource provider 104(1) would be negative, so step 1608 would determine whether there are any additional calls to other resource providers. If there are, step 1608 branches to step 1602 and continues as described above. If there are no more additional calls to be made for the particular configuration, then step 1610 either gets the next configuration or activity and repeats the processing described above, or quits. If step 1606 determines that there is one or more dependent resource providers, step 1612 calls the dependent resource provider or providers. Accordingly, when a resource provider is called, it is programmed to know which other resource providers to call. In the FIG. 15 example, when the application calls resource provider 104 (2), the resource provider knows to call resource provider 104(3) (step 1606). Accordingly, it calls resource provider 104(3) and hands it the activity handle and resource identifier for its resource descriptor in the configuration that is being populated. Responsive to receiving this call, resource provider 104(3) supplies additional information (step 1616) regarding its resource that is used to build or populate the configuration. Step 1616 then branches back to step 1606 and determines whether there are any additional dependent resources. This step can be performed either by resource provider 104(2) (in the event it depends on more than one resource provider) or by resource provider 104(3) (in the event that it depends on a resource provider). In this particular example, this step is performed by resource provider 104(3) because resource provider 104(2) only depends on one resource provider. In this particular case, since resource provider 104(3) depends on resource provider 104(4), processing would proceed through steps 1612-1616 and, depending on whether there were any additional calls, would either proceed to step 1602 or 1610.

In the illustrated example, information is received from a plurality of different resource providers and utilized to build a configuration comprising a hierarchical tree. The tree is maintained by the resource manager 102 and utilized to make reservations and promulgate error notifications.

Error Notifications

After one or more configurations have been built for one or more activities, the resource manager 102 can attempt to reserve configurations for the activities. Exemplary processes for doing this are described in detail above. During the course of trying to reserve configurations, it is possible that one or more resources cannot be reserved. In that case the reservation fails and the resource is not available. When this happens, it is desirable to notify the resource consumer of the failed reservation. One reason for this is that the resource consumer may, once informed, attempt to construct or reserve alternate configurations. Another reason for this is that the resource consumer might be presented with various options, i.e. other resource settings, that might allow the resource consumer to perform its task.

Notifications, however, pose some challenges in embodiments where the resource consumer is not aware of a dependent resource that has failed or been preempted. For example, and with reference to FIG. 15, if during the course of trying to reserve the resource associated with resource provider 104(4) the reservation fails, the error message that is generated by the resource provider 104(4) will typically contain proprietary terms that would not be understood by the resource consumer. Thus, there needs to be a way for the failure to be articulated to the resource consumer in an intelligible way. In the embodiment that utilizes the hierarchical tree configuration, the error reporting is accomplished by simply following the chain of resource dependencies until a resource provider is found that the resource consumer recognizes. The error is then reported to the resource consumer through the recognized resource provider. During this process, the error message that is initially promulgated by the dependent resource provider is received in its proprietary form by its parent resource provider, translated into a form that is understood by the next in line resource provider and forwarded accordingly. Ultimately, what reaches the resource consumer is an error notification that is presented in terms that are understood by the resource consumer.

As an example, consider the following: An application tries to reserve a USB camera resource so that it can be played at 30 frames/second. Although the camera resource may be available, assume that there is not enough USB bandwidth to accommodate the 30 frames/second. The failure that gets generated is generated by the USB bandwidth resource provider and is defined in proprietary terms that are not understood by the application. Thus, the failure from the USB bandwidth provider is reported to its parent—the USB camera resource provider. The USB camera resource provider translates the failure to the form reported to the application.

Error reports to the resource consumer may take different forms. For example, an error report might simply report that a known resource, e.g. the camera resource, is presently unavailable. Alternately, the error report can present one or more options to the resource consumer in the event of a failure. For example, where a USB camera resource fails due to a shortage of USB bandwidth, the USB bandwidth resource provider might give the USB camera provider the bandwidth it has available. The USB camera resource provider could then translate this information to a form that the application understands and give it an option of a reduced frame rate (e.g. 5 frames/second) or a reduced window size. In this instance, the task would still be capable of being performed, albeit with a different allocation of resources. Although the above example is given in terms of a reservation failure, the same error reporting example applies when a resource is preempted for use by another activity.

The error report may, however, have another effect. Specifically, some resource providers can be programmed to attempt to remedy or trouble shoot particular problems that might arise and cause failures. In this instance, it would not be necessary to report the error to the resource consumer. Trouble shooting can occur at any place in the chain of dependencies. For example, consider a resource provider that manages a hardware device. Assume that the hardware device is not available because of a preemption. The resource provider, rather than promulgating an error report to the resource consumer, might provide a "virtual device" that looks to the resource consumer as if it is the real hardware device. The resource consumer would then unknowingly use the virtual device until the real hardware device became available. In this manner, no error is reported to the resource consumer and the task can still be performed.

Using the hierarchical tree configuration makes error reporting much more efficient than a flat or linear configuration because of its implicit ordering. Although using a flat or linear configuration is possible, it is less desired.

Figure 17:
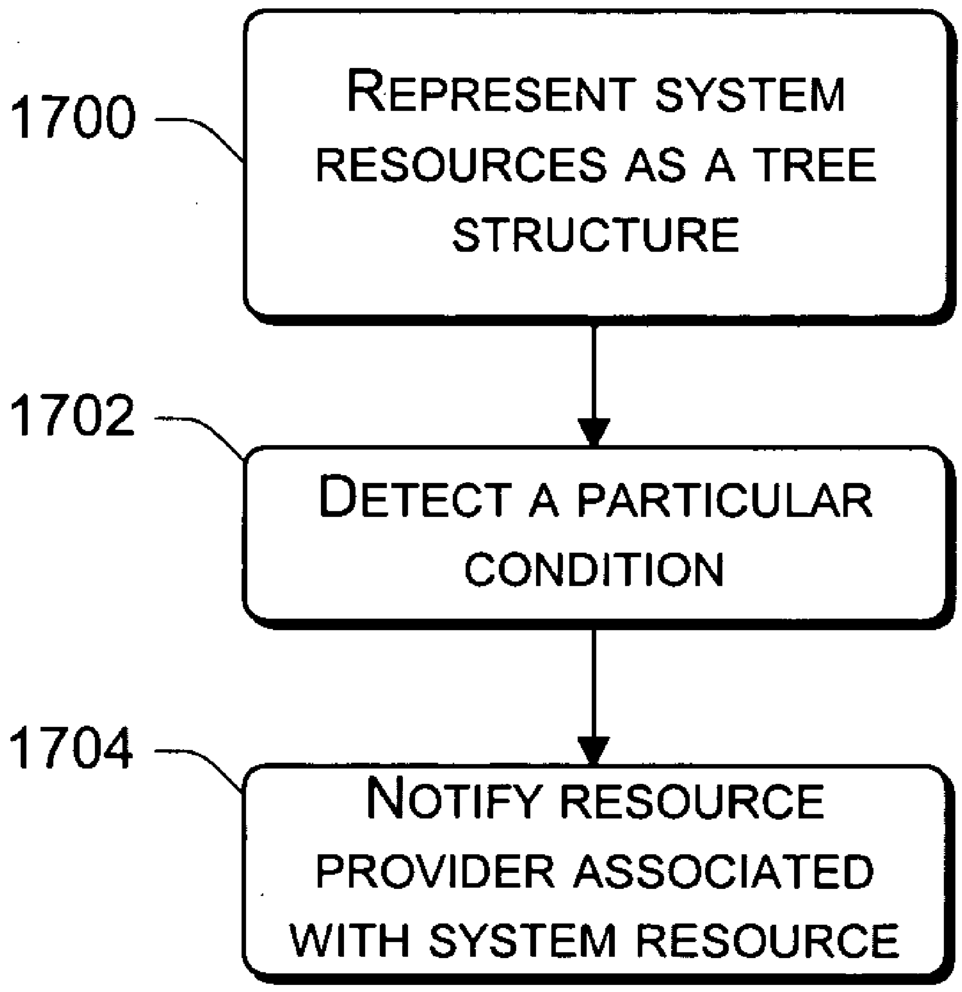
FIG. 17 is a flow diagram that describes steps in an error reporting method in accordance with the described embodiment.

FIG. 17 describes steps in an error reporting method in accordance with the described embodiment. Step 1700 represents resources as a hierarchical tree structure. Specific examples of how this can be done and exemplary structures are given above in the "Configuration Building" section. Step 1702 detects a particular condition that is associated with a particular resource. In this example, the particular condition is an error condition and step 1702 can be performed by the resource manager 102 (FIG. 15) because it is programmed to know when there a reservation failure or a preemption. This is because the resource manager runs the resource calculations and determines resource conflicts. Step 1704 then notifies the resource provider that is associated with the resource. To do this, the resource manager calls back into each provider (i.e. providers set up a call back when they register). The resource manager gives the current error packet (initially it is empty) to the provider and then receives back from the provider a translated packet. This translated packet is then handed off to the next provider in the chain and so on. One of the providers may fix the error itself, in which case the packet does not have to be forwarded any further up the chain.

Policy Manager

A policy manager, in association with the resource manager, determines which applications will be allowed to access and use the limited resources when more than one application vies for the same resource. The applications themselves do not initiate and utilize the resources of their own accord, nor do the applications control the priorities of the resource managed activities. Rather, the resources are allocated by the resource manager based on the policies established at the policy manager.

There are possible different types of policies. One set of policies, for example, may be used in conjunction with priority-based conflict resolution, which determines resource allocation based upon which applications and/or users have priority over others to use the resources. The term "priority" is not used in the sense of a traditional thread or process priority, but in the context of an arbitration policy between consumers contending for the same resources. Priorities are not assigned to individual resources, but rather are assigned to the activities established at the resource manager by the applications.

The policies determine which activities are "more important" or "less important" in some way (e.g., "more important" to the user) in comparison to other activities. This allows the resource management architecture to transfer desired, but limited, resources from the less important activities to the more important activities.

Another viable policy is "first reservations wins". By following this policy, the resource manager would reserve resources for activities on a first-come-first-served basis.

Another possible policy is "most recent reservations win". With this policy, the resource manager attempts to reserve resources for the activities that most recently sought reservation.

Other possible policies include resource sharing to achieve some type of balance or cooperation guidelines, user-specified winners in which the user picks which activities are more important, and so forth.

The resource management architecture 100 shown in FIG. 2 implements a resource manager 102 that makes resource allocation decisions based on policies established by a separate and independent policy manager 108. The policy manager 108 determines, independently of the applications, which activities should get access to resources when there is a conflict such that not all activities can be allocated the resources. The system or user sets the policies 110 and the policy manager 108 translates them into absolute priorities.

Figure 18:
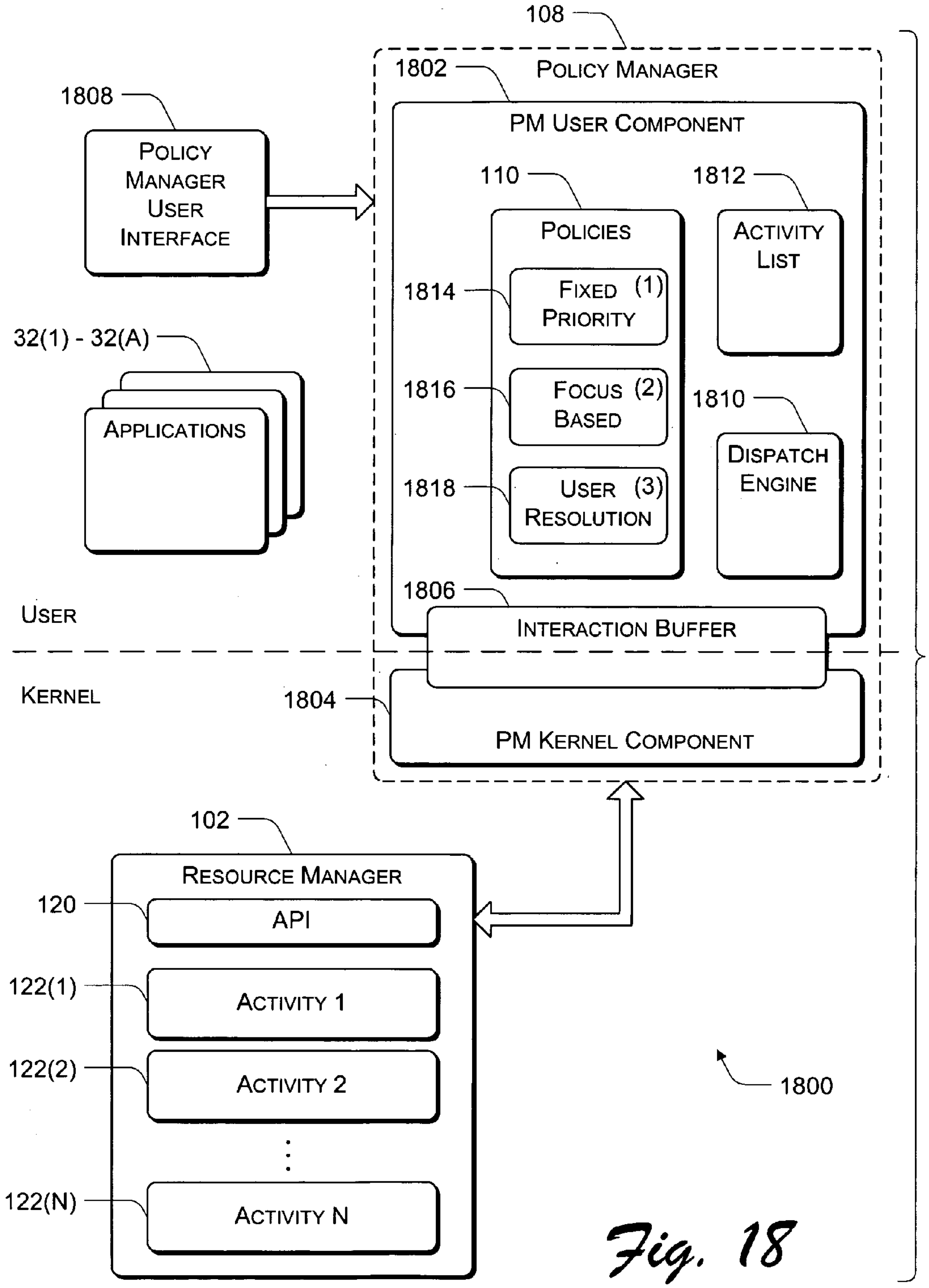
FIG. 18 is a block diagram of an exemplary policy management architecture, further illustrating a policy manager implemented with the resource management architecture of FIG. 2.

FIG. 18 shows one exemplary policy management architecture 1800 that illustrates utilizing the policy manager 108 in conjunction with the resource management architecture 100. The resource manager 102 exposes a defined API (application program interface) 120 to accept requests for resources from the applications 32(1)-32(A). One API is described below in detail under the heading "Resource Manager API". When an application 32 wants to perform a task, it uses the API 120 to create an activity 122 at the resource manager 102. An activity is a data structure associated with a task being performed in the system. One activity exists per task being performed. The resource manager 102 is shown containing activities 122(1)-122(N) created by the applications 32(1)-32(A).

The policy management architecture 1800 is implemented in software, and in this example, includes the policy manager 108 having components at both the user level and the kernel level. The policy manager 108 has a user component 1802, a kernel component 1804, and an interaction buffer component 1806. The policy manager interaction buffer 1806 holds notifications between the policy manager kernel component 1804 and policy manager user component 1802.

A policy manager user interface 1808 resides at the user level and is external to the policy manager 108. The policies are initially created within the system, yet are designed to be flexible so that a user can optimize the system by customizing the policies as well as adjusting how the policies are interpreted and used by the policy manager 108. Through the user interface 1808, a user can define policies and establish the order in which policies will be applied to resolve resource reservation conflicts between applications vying for the same resource.

The policy manager kernel component 1804 is an interface between the policy manager 108 and the resource manager 102 to control activity priorities and priority modifications. The policy manager kernel component 1804 opens a resource management defined call-back object and registers a call-back routine. The resource manager 102 uses the call-back object to notify the policy manager 108 of an activity event at the resource manager 102.

The policy manager user component 1802 is implemented by three components: (1) the aforementioned policies component 110, (2) a policy manager dispatch engine 1810, and (3) an activity list 1812. The policies component 110 maintains the policies used to make resource allocation decisions and the policies used to resolve resource allocation conflicts. The policies maintained in the policy component 110 include a fixed priority policy 1814, a focus based policy 1816, and a user resolution policy 1818. The policies are applied to resolve resources conflicts in the order indicated by the policy enumerations (1)-(3); i.e., if a resource conflict cannot be resolved using the fixed priority policy 1814, enumerated as (1), then policy (2), the focus based policy 1816, will be applied, and so on.

The policies utilize activity-specific information that applications 32 provide to prioritize the system activities. The applications 32 provide this information by setting policy attributes for the activities. The information is provided via an API set that creates, deletes, modifies, and retrieves the policy attributes. This API set is an extension of the RMU API described below in detail under the heading "Resource Manager API". The specific API set is described below under the heading "Extension to the RMU API".

The resource manager 102 notifies the policy manager 108 of an activity event when activities 122 are created or destroyed, and when resources are reserved or unreserved for an activity configuration. The policy manager 108 is also notified when there is a resource reservation conflict between activities and when the process of a user interactive application attains system focus.

The policy manager dispatch engine 1810 receives the activity event notifications from the resource manager 102, via the policy manager kernel component 1804 and interaction buffer component 1806, and then dispatches the notifications to the policies 110 for further action. The policy manager dispatch engine 1810 determines the absolute activity priorities after the activities have been "graded" by the policies 110. The policy manager dispatch engine 1810 also maintains a list of all of the policies as well as the activity list 1812 with the associated priority of each activity.

More specifically, the policy manager dispatch engine 1810 receives the activity event notifications from the resource manager 102 when applications call the methods RMCreateActivity, RMDestroyActivity, RMReserveResources, and RMUnreserveResources. Upon receiving the event notifications, the policy manager dispatch engine 1810 updates the activity list 1812 and sends the notifications to the policies 110. The policies 110 can trigger a reprioritization of the activity data structures such that the activity list is reprioritized according to the relative importance ordering of the current activities in the system.

The activity list 1812 is an object used by the policy manager dispatch engine 1810 to pass a list of current activities to the policies 110 for priority ordering of the activities. The activity list 1812 is passed as a collection of activity information objects containing all of the activities 122. The policies 110 modify the collection of activity information objects into sub-sets of activities in priority order. Activities in the same sub-set receive the same absolute priority when the policy manager dispatch engine 1810 determines the absolute activity priorities after the policies 110 have completed grading the activities 122.

The fixed priority policy 1814 determines activity priorities based on user-defined importance ordering of activity categories. For example, a user can define the following activity categories as having a particular order of importance:

| | | Category | Category Importance |
|---|---|---|---|
| | Existing Activities | | |
| A1 | Watching $DVD_1$ | C1 | 1 |
| A2 | Watching TV | C2 | 2 |
| A3 | Watching $DVD_2$ | C3 | 3 |
| | New Activity | | |
| A4 | Recording | C2 | 2 |

Activities A1-A3 are existing at resource manager 102. When a new activity A4 is created, the resource manager 102 notifies the policy manager 108 of an activity event. The policy manager dispatch engine 1810 updates the activity list 1812 and passes the list of current activities 122 to the policies 110 for priority ordering of the activities 122. The fixed priority policy 1814 modifies the activity list 1812 into sub-sets of activities in priority order:

| Priority Set | Activities |
|---|---|
| 1 | A1 |
| 2 | A2, A4 |
| 3 | A3 |

The focus based policy 1816 determines activity priorities based on the focus history of the processes that have created resource management activities 122. Only user interactive applications require a focus basis for maintaining a focus history. Thus, the focus based policy 1816 prioritizes those activities 122 created by user interactive applications. When the process of a user interactive application gains focus, the process's activity is identified first in the focus history.

From the example above, a user has defined activities A1-A4 as having a particular order of importance, whereupon the fixed priority policy 1814 determined to which priority set each activity belonged. If the user begins watching TV (activity A2, priority 2) and recording (activity A4, priority 2) is subsequently scheduled to occur, the resource manager 102 must determine to which activity it should allocate the system's one tuner resource. The focus based policy 1816 would identify the process of presenting the image from TV as first in the focus history when the user began watching TV. Accordingly, activity A2 would have focus priority in Priority Set 2:

| Priority Set | Activities |
|---|---|
| 1 | A1 |
| 2 | (A2), A4 |
| 3 | A3 |

The user resolution policy 1818 resolves a resource reservation conflict when the resource manager 102 is unable to resolve a conflict based on current activity priorities. For example, a user may have scheduled two recording activities to record two different channels starting at the same time:

| | Existing Activities | Category | Category Importance |
|---|---|---|---|
| A1 | Record A | C1 | 1 |
| A2 | Record B | C1 | 1 |

Initially, the fixed priority policy 1814 would determine the activity priorities and policies 110 would modify the activity list 1812 into priority sub-sets of the activities:

| Priority Set | Activities |
|---|---|
| 1 | A1, A2 |

Given that both activities A1 and A2 have the same priority to the user, a resource conflict occurs when the resource manager 102 must determine to which activity it should allocate the system's one tuner resource. The focus based policy 1816 cannot resolve the conflict because neither Record A nor Record B is a process having gained the system focus.

Upon receiving information from the policy manager dispatch engine 1810 that a conflict exists between activities A1 and A2, the user resolution policy 1818 communicates with the user via the policy manager user interface 1808 for a resolution of the conflict. When the user re-prioritizes the activities, the policy manager policies 110 modify the activity list 1812 to reflect the user's resolution choice. The user resolution policy 1818 also maintains a user resolution history for all activities over their lifetime to reduce the necessity of user interaction to resolve resource conflicts.

Figure 19:
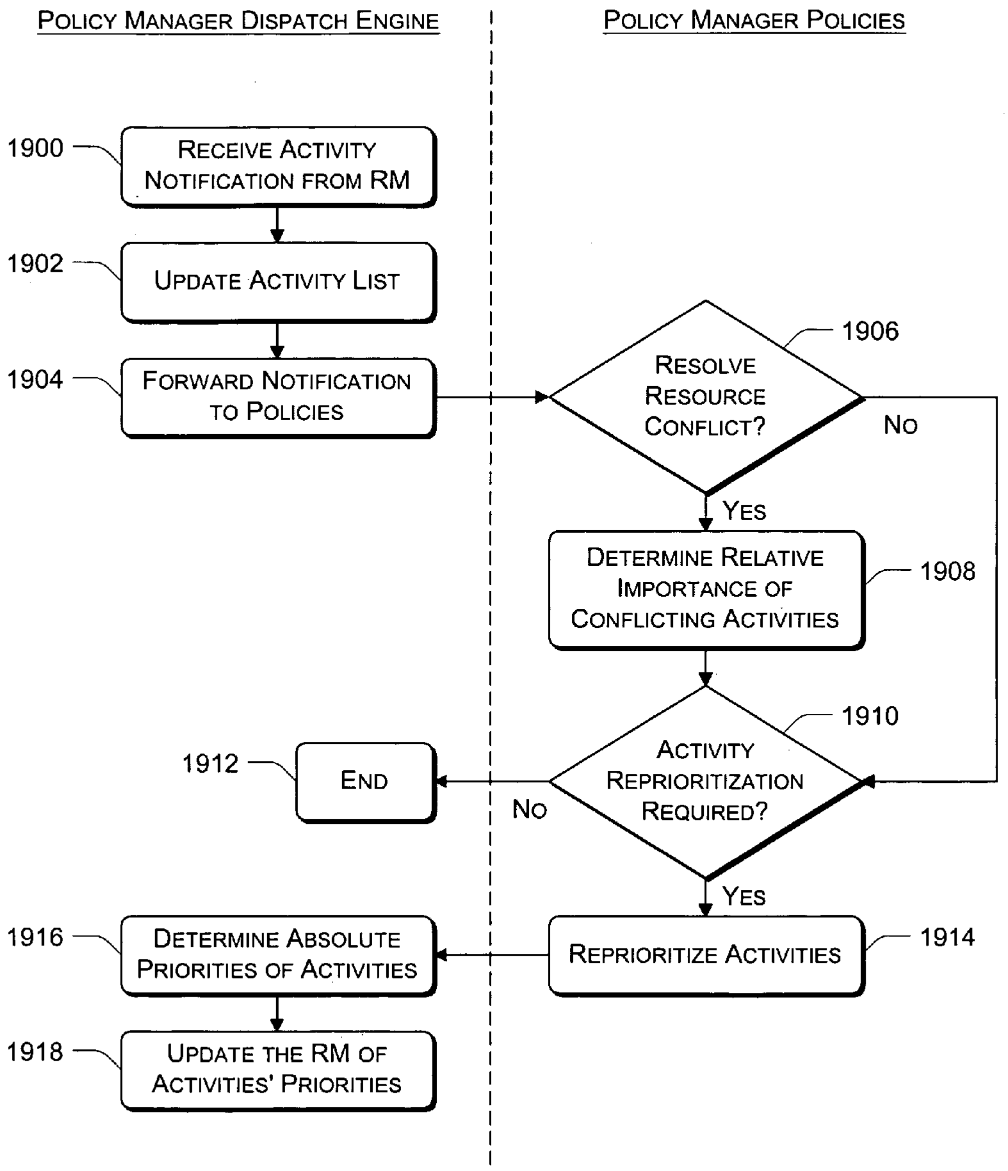
FIG. 19 is a flow diagram that describes steps in an exemplary policy management method that is implemented by the FIG. 18 policy management architecture.

FIG. 19 shows steps in a method for the policy management of activities created at the resource manager 102. At step 1900, the policy manager dispatch engine 1810 receives an activity notification from the resource manager 102. The policy manager 108 is notified for activity creation, activity destruction, activity reservation, activity unreserve, and for a resource reservation conflict.

Upon receiving an activity notification, the policy manager dispatch engine 1810 updates the activity list 1812 (step 1902). The policy manager dispatch engine 1810 then forwards the activity notification to the policies 110 (step 1904).

At step 1906, the policies 110 determine whether the activity notification (step 1900) was for a resource reservation conflict between two or more activities. If the policies need to resolve a conflict (i.e., the "yes" branch from step

1906), then the policies determine the relative importance of the conflicting activities (step 1908). This may involve consulting with the user via the user resolution policy 1818 as described above.

After determining the relative importance of the conflicting activities (step 1908), or if the policies do not need to resolve a conflict (i.e., the "no" branch from step 1906), the policies determine whether activity reprioritization is required (step 1910). Typically, activity reprioritization is required for activity creation and activity reservation. Activity reprioritization is typically not required for activity destruction or activity unreserve.

If activity reprioritization is not required (i.e., the "no" branch from step 1910), then the policy manager 108 does not need to update the resource manager 102 of the activities' priorities and the method is ended (step 1912). If activity reprioritization is required (i.e., the "yes" branch from step 1910), then the policies 110 reprioritize the activities (step 1914). After the activities have been reprioritized, the policy manager dispatch engine 1810 determines the absolute priorities of the activities (step 1916). The policy manager dispatch engine 1810 then updates the resource manager 102 of the priorities of the activities (step 1918).

The above examples assume that the policies work together with priority based conflict resolution. However, in other situations, there may be no priority amongst the resource consumers. That is, the activities associated with the applications may have equal priority or no priority at all.

Consider the following scenario. Activity A1 has two configurations C1 and C2. The most preferred configuration C1 requires two resources $R_1$ and $R_2$. The less preferred configuration C2 utilizes only one resource $R_1$. Activity A2 has two configurations: (1) a most preferred configuration C1 which utilizes two resources $R_1$ and $R_2$ and (2) a less preferred configuration C2 which utilizes only one resource $R_2$.

An attempt to simultaneously run the preferred configurations of activities A1 and A2 results in a conflict. In this situation, the resource manager might elect to execute the second configurations for both activities, which allows the two activities to continue simultaneously. Since there is no priority distinction between activities A1 and A1, there is no need to execute one activity at the expense of the other.

Another set of policies may involve running as many activities as possible, with each activity using a less preferred configuration, rather than running fewer activities with their most preferred configurations. For example, in the above scenario, even assuming that activity A1 has a higher priority than activity A2, the policy manager might prefer to run both of them using their secondary configurations rather than only performing activity A1 using its best configuration.

Following are exemplary methods utilized in association with the policy management architecture.

Methods in the CPolicyManager Class 1. void Reprioritize( )
   a) Description
   This method is exposed by the main policy manager dispatch engine (CPolicyManager) so that policies can trigger a reprioritization of activities. For example, the focus policy would use this method to trigger a reprioritization of activities whenever focus changes to an application which has created an activity in the resource manager. This method would post a notification in the policy manager dispatch engine and then return. As a result of this notification, the policy manager dispatch engine would call CPolicyManager::CalculatePriorities( ) which would hand the activity list to the policies for reprioritization.
   b) Return Value
   None.
2. HRESULT CalculatePriorities( )
   a) Description
   This method is used to calculate priorities for all activities in the system. This method would call CPolicy::CalculatePriorities( ). The resulting compartmentalized activity list would then be used to calculate the absolute priorities of the activities which would then be set in the resource manager.
   b) Return Value
   S_OK if successful.
   E_FAIL otherwise.
3. CActivityList*GetActivityList( )
   a) Description
   This method will be used by the policies to get the list of current activities in the system. This would be used, for example, by the focus based policy when it initializes to get the current list of activities in the system so that it could start maintaining the focus history for the processes which have a resource manager activity associated with them.
   b) Return Value
   A pointer to the CActivityList object, which exposes methods such that the activities in the system can be enumerated.
4. void OnNewActivity(PRM_ACTIVITY Activity)
   a) Description
   This method will be called by the policy manager dispatch engine when it receives notification from the resource manager that a new activity has been created. This method would create a new CActivity object which reflects the activity created in the resource manager and then pass on this notification to all of the policies by calling CPolicy::OnNewActivity( ). The policies can then process this notification and trigger a reprioritization if necessary.
   b) Parameters
   Activity—A structure of type PRM_ACTIVITY as defined in the appendix. The structure contains the activity handle and the owning process id.
   c) Return Value
   None.
5. void OnDestroyActivity(PRM_ACTIVITY Activity)
   a) Description
   This method will be called by the policy manager dispatch engine when it receives notification from the resource manager that an activity has been destroyed. This notification would be passed on to all of the policies using CPolicy::OnDestroyActivity( ). The activities can use this to clean up their private information or trigger a reprioritization if necessary.
   b) Parameters
   Activity—A structure of type PRM_ACTIVITY as defined in the appendix. The structure contains the activity handle and the owning process id.
   c) Return Value
   None.
6. void OnReserve(PRM_ACTIVITY Activity)
   a) Description
   This method will be called by the policy manager dispatch engine when it receives notification from the resource manager that reservation for an activity configuration has been completed. This notification would be passed on to all of the policies using CPolicy::OnReserve( ).

b) Parameters

Activity—A structure of type PRM_ACTIVITY as defined in the appendix. The structure contains the activity handle and the owning process id.

c) Return Value

None.

7. void OnUnreserve(PRM_ACTIVITY Activity)

a) Description

This method will be called by the policy manager dispatch engine when it receives notification from the resource manager that un-reservation for an activity configuration has been completed. This notification would be passed on to all of the policies using CPolicy::OnUnreserve( ).

b) Parameters

Activity—A structure of type PRM_ACTIVITY as defined in the appendix. The structure contains the activity handle and the owning process id.

c) Return Value

None.

8. HRESULT OnConflict(PRM_ACTIVITY conflictingActivity, PRM_ACTIVITY *victimArray, ULONG ulNumVictims)

a) Description

This will be called when the resource manager is unable to resolve a resource conflict using current activity priorities. This method would then call CconflictPolicy::OnConflict( ) to get a resolution for the conflict. Upon resolution of the conflict, the new activity priorities would be set in the resource manager by the policy manager dispatch engine.

b) Parameters conflictingActivity—is the activity that caused a resource conflict on reservation. It is a structure of type PRM_ACTIVITY as defined in the appendix. The structure contains the activity handle and the owning process id.

VictimArray—Array of PRM_ACTIVITY structures which are the victim activities.

UlNumVictims—Number of victim activities.

c) Return Value

S_OK if conflict is resolved by the policy.

E_FAIL otherwise.

Methods in the CBasePolicy Class 1. virtual HRESULT GetPolicyName(LPTSTR *pBuffer, ULONG *pBufSize)=0 a) Description

Get the name for the policy.

b) Parameters

PBuffer—pointer to the buffer in which the name will be copied whose size is specified by ulBufSize.

pBufSize—size of the buffer. The size of the policy name would be copied onto.

c) Return Values

S_OK if successful.

E_OUTOFMEMORY if not enough memory is available in which case the required size would be copied into pBufSize.

E_FAIL otherwise.

2. virtual void OnNewActivity(CActivity *pActivity)

virtual void OnDestroyActivity(CActivity *pActivity)

virtual void OnReserveActivity(CActivity *pActivity)

virtual void OnUnreserveActivity(CActivity *pActivity)

a) Description

These are the notification methods that are called by the policy manager dispatch engine (CPolicyManager) upon receiving notifications from the resource manager. Policies can trigger a reprioritization on these notifications by calling CPolicyManager::Reprioritize. They can also update their private information using these notifications. For example, the focus policy would add the new activity to its focus history tracking when its OnNewActivity( ) is called.

b) Parameters

PActivity: pointer to the CActivity object which contains the activity handle, the owning process id and other activity specific information.

c) Return Value

None.

Methods in the CPolicy Class (in Addition to Methods in CBasePolicy)

1. virtual HRESULT CalculatePriorities(CBucket List *pBucketList)=0 a) Description

This method will be called by the policy manager dispatch engine (CPolicyManager) to calculate priorities for activities in the system. The bucket list would initially contain a single bucket with all the activities in the system when this method is called on the first policy. The policy would then compartmentalize this bucket list. The compartmentalized bucket list would then be passed on to other policies by the policy manager dispatch engine for further processing.

b) Parameters

PBucketList: Pointer to the CBucketList object which is a list of buckets containing activity objects.

c) Return Value

S_OK if successful.

E_FAIL otherwise.

Methods in CConflictPolicy Class (in Addition to the Methods in CBasePolicy)

1. virtual BOOL OnConflict(CActivity *pConflictingActivity, CActivityList *victimActivityList)=0 a) Description

This method will be called by the policy manager dispatch engine (CPolicyManager) when the resource manager is unable to resolve a resource conflict using current activity priorities. This method would resolve the conflict by determining if the conflicting activity is more important than all the activities in the victim list or otherwise.

b) Parameters

PConflictingActivity—activity causing the conflict during reservation.

VictimActivityList—a list of victim activities that would need to give up resources to satisfy the reservation by the conflicting activity.

c) Return Values

TRUE if pConflictingActivity is more important than all the activities in the victim list.

FALSE otherwise.

Extension to the Resource Manager API

1. HRESULT SetPolicyAttribute(IN HANDLE hActivity,

IN LPTSTR pAttrName,

IN DWORD dwType,

IN LPBYTE pData,

IN DWORD cbData)

a) Description

Method used to add a policy attribute to the policy database. The application can specify policy attributes using the handle to the activity it received from RMCreateActivity( ).

b) Parameters hActivity—Handle to the activity returned by RMCreateActivity( ).

pAttrName—pointer to a buffer that contains the name of the policy attribute, including the terminating null character.

dwType—a DWORD code that indicates the type of data stored in the specified value. For a list of possible type codes, see Registry Value Types in the Platform SDK documentation.

pData—pointer to a buffer that contains the data for the specified value.

cbData—size of the pData buffer.

2. HRESULT GetPolicyAttribute(IN HANDLE hActivity,
IN LPTSTR pAttrName,
OUT LPDWORD lpType,
OUT LPBYTE pData,
OUT LPDWORD lpcbData)

a) Description

Method used to retrieve a policy attribute to the policy database.

b) Parameters hActivity—Handle to the activity returned by RMCreateActivity( ).

pAttrName—pointer to a buffer that contains the name of the policy attribute, including the terminating null character.

lpType—a pointer to a variable that receives the code that indicates the type of data stored in the specified value.

pData—pointer to a buffer that receives the data for the specified value.

lpcbData—size of the pData buffer that is returned.

Architecture with Intelligent Interface Component

The resource management architecture 100 illustrated in FIG. 2 assumes that the applications 32 are sufficiently intelligent to request the resources needed to complete a task. In some cases, however, it may be desirable that the applications not have full or any knowledge of the resources they need. Moreover, the resource management architecture 100 may be implemented in an environment where there are legacy applications. In such situations, it is desirable that the legacy applications be able to utilize the resource management architecture, even though the application may not know such an architecture exists.

Figure 20:
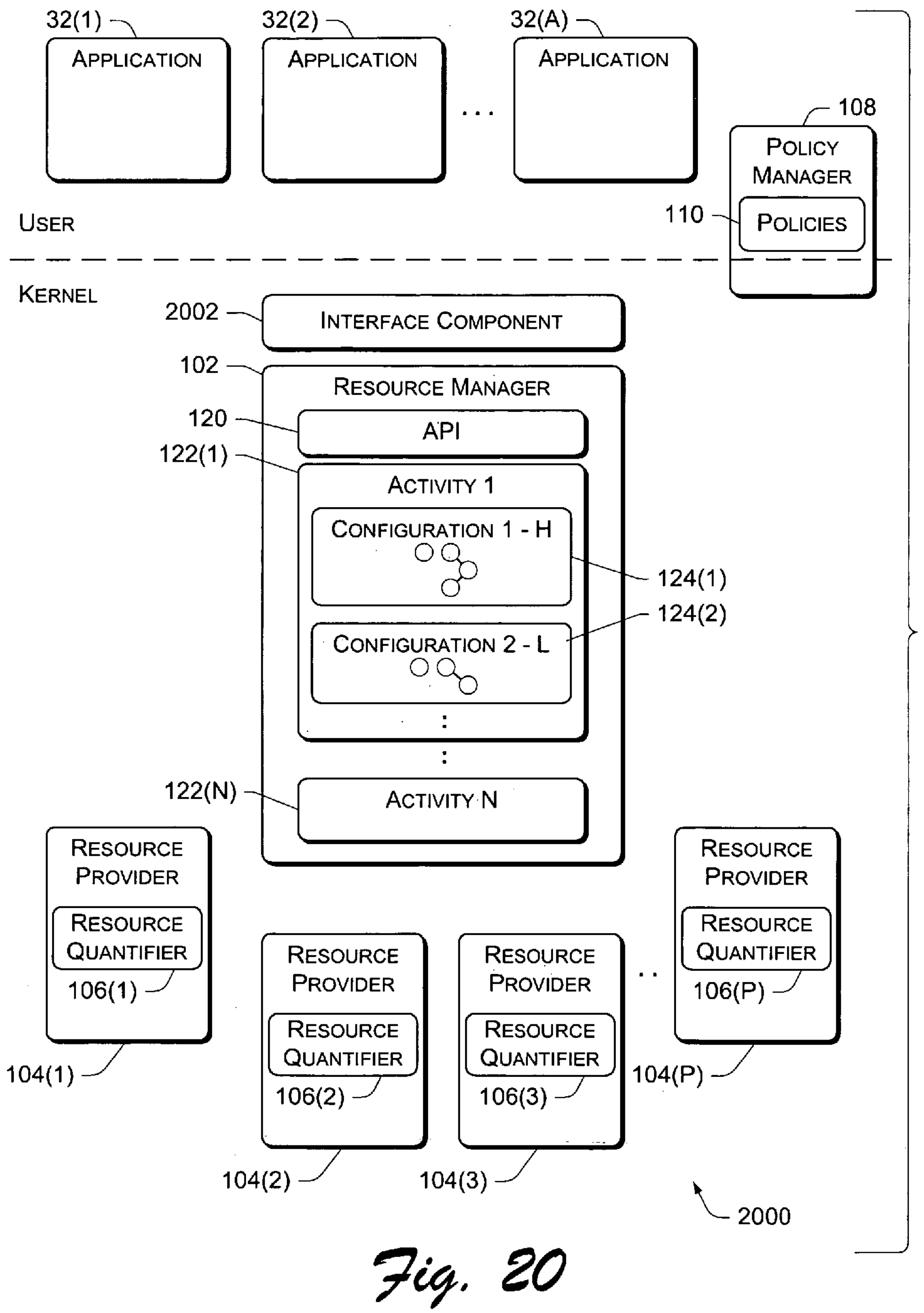
FIG. 20 is a block diagram of another exemplary resource management architecture that is similar to that of FIG. 2, but further includes an intelligent interface component.

FIG. 20 shows a resource management architecture 2000 that is similar to that of FIG. 2, but includes an intelligent interface component 2002 that intercedes on behalf of the applications to request resources. The intelligent interface component 2002 may be a kernel-level component (as shown) or a user-level component.

With the inclusion of the intelligent interface component 2002, the applications 32 need not know what resources they need to complete a task. For instance, suppose an application 32(1) is a TV application. The TV application may be concerned with how to present streaming content on a display, but have little care for how the streaming content is received and displayed in the first place. That is, the TV application may not be fully aware that a particular tuner, decoder, and filter are needed to receive and display the TV programming.

In such cases, the interface component 2002 is designed to understand which resources are needed for a generic level activity, such as displaying television. Thus, when the application 32(1) is launched, it calls to the interface component 2002 to request playing of the TV programming. The interface component 2002, in turn, interacts with the resource manager 102 to create the activities and build the configuration(s) of tuning, decoding, and filtering resources needed to play the programming. At this point, the interface component 2002 essentially acts as the consumer in its dealings with the resource manager for purposes of requesting reservation of the resources, as described above with respect to the process of FIG. 3.

Architecture with Schedule and Stateless Providers

In the resource management architecture 100 illustrated in FIG. 2, the resource providers 104 may have some idea to which activity it is currently allocated, the quantity of the resource that has been allocated, as well as the concept that it is being allocated now. However, this need not be the case. Instead, the resource providers may be configured without any knowledge of the owning application or allocated resource quantities. This information is maintained by the resource manager 102 on behalf of the resource providers 104. In this configuration, the resource providers are said to be "stateless". One reason the use of stateless resource providers is beneficial is that it allows the architecture to evaluate possible configurations that may be requested in the future.

Figure 21:
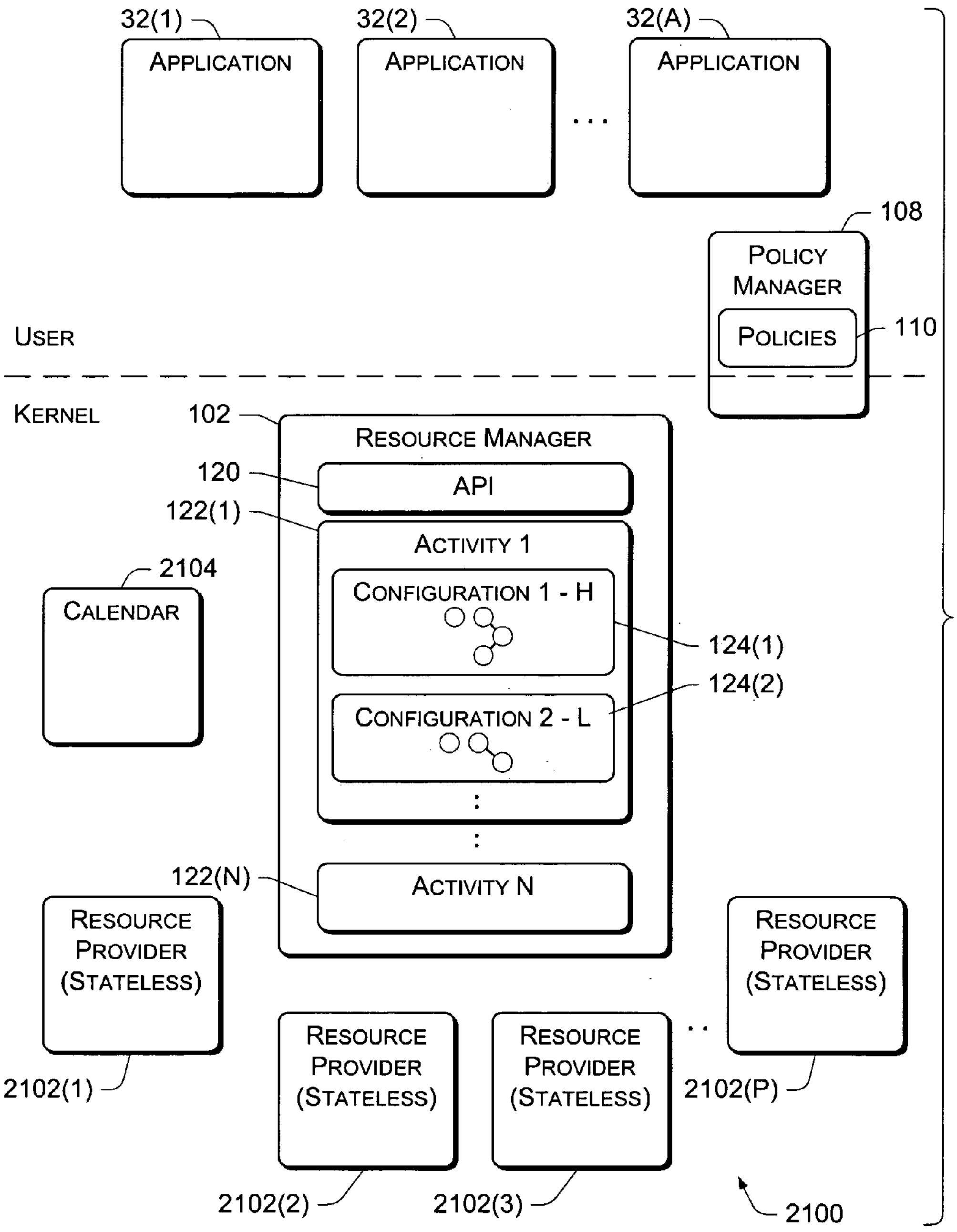
FIG. 21 is a block diagram of yet another exemplary resource management architecture that is similar to that of FIG. 2, but further includes a scheduling component.

FIG. 21 shows a resource management architecture 2100 that differs from the architecture of FIG. 2 in that the resource providers 2102(1), 2102(2), . . . , 2102(P) are stateless. The stateless resource providers are configured with no concept of time and hence, have no idea whether they are being requested now or in the future. The resource providers 2102 are only concerned with what resources and how much of them are being used at any given request and this information is supplied to them by the resource manager.

The architecture 2100 also includes a scheduler 2104 to schedule allocation of a set of the resources at a later time. The scheduler 2104 includes a calendar to track the time of day and date. The scheduler 2104 is configured to run "what if" scenarios to determine whether resources controlled by the stateless resource providers 2102 will be available at selected times. For example, suppose the scheduler 2104 mocks up one or more configurations of resources that are representative of system usage at a prime time, such as 8:00 PM. The scheduler 2104 then asks the resource providers 2102 whether they could allocate resources to these configurations. Since the providers have no concept of time and the state data on which they have to base their decisions is handed to them by the resource manager, they simply indicate whether they could meet such a collection of configurations.

Resource Manager API

The following is an exemplary API for the resource manager. The API calls described below are available in kernel mode. The resource manager API includes a provider interface (Section A) and a consumer interface (Section B).

A. Provider Interface

Provider API Calls

1. RmRegisterResource a) Prototype

```
NTSTATUS
    RmRegisterResource (
    IN LPCGUID ResourceType,
    IN PUNICODE_STRING ResourceName,
```

-continued

```
IN PVOID ProviderContext,
IN ULONG AccumulatorSize,
IN RM_PROVIDER_CALLBACK CallbackTable,
OUT PRM_HANDLE ResourceHandle
);
```

b) Description

Resource providers use this function to register resources. Each provider should call this function once for each resource type supported.

c) Parameters

ResourceType: Pointer to a resource type GUID, describing the type of the resource.

ResourceName: Unicode string specifying a user-readable name for the resource.

ProviderContext: Pointer to provider context. This context pointer will be passed back to the provider in all callbacks from the resource manager.

AccumulatorSize: Size in bytes of the resource accumulator buffer. Whenever the resource manager needs to create a resource accumulator, it will allocate this amount of memory on behalf of the resource provider.

CallbackTable: A pointer to a structure containing pointers to callback functions through which the resource manager will call back into the provider. This structure is defined as follows:

```
typedef struct_RM_PROVIDER_CALLBACK {
    USHORT Version;
    USHORT Size;
    PRM_PROVIDER_ACCUMULATOR_ADD AccumulatorAdd;
    PRM_PROVIDER_ACCUMULATOR_INIT AccumulatorInit;
    PRM_PROVIDER_ACCUMULATOR_FREE AccumulatorFree;
    PRM_PROVIDER_ACCUMULATOR_COPY AccumulatorCopy;
    PRM_PROVIDER_RESERVE_NOTIFY NotifyOnReserve;
    PRM_PROVIDER_UNRESERVE_NOTIFY NotifyOnUnreserve;
    PRM_PROVIDER_REMOVE_NOTIFY NotifyOnRemove;
} RM_PROVIDER_CALLBACK, *PRM_PROVIDER_CALLBACK;
```

The callback structure fields are as follows:

Version: The version of the interface. The provider must set this to RM_VERSION_NUM before calling RmRegisterResource.

Size: The size of the structure. The provider must set this to size of (RM_PROVIDER_CALLBACK) before calling RmRegisterResource.

AccumulatorAdd: Callback into the provider to be called to add resource attributes to a resource accumulator. If the addition does not cause a resource overallocation, AccumulatorAdd should update the accumulator and return STATUS_SUCCESS. If the addition does cause a resource overallocation, the provider should return STATUS_RESOURCE_UNAVAILABLE, with the buffer left in an undetermined state. Any other error should return an appropriate error code.

The prototype for the AccumulatorAdd function is as follows:

```
NTSTATUS
    AccumulatorAdd (
    IN PVOID ProviderContext,
    IN PVOID AttributeBuffer,
    IN OUT PVOID Accumulator
    );
```

AccumulatorInit: Callback into the provider to be called to initialize a resource accumulator buffer. If NULL, the resource manager will 0-init the buffer. This callback gives resource providers the opportunity to do any special initialization processing on a resource accumulator buffer before it is used.

The prototype for the AccumulatorInit function is as follows:

```
NTSTATUS
    AccumulatorInit (
    IN PVOID ProviderContext,
    IN OUT PVOID Accumulator
    );
```

AccumulatorFree: Callback into the provider to be called before the resource manager frees an accumulator buffer. If NULL, the resource manager will not take any special actions when freeing an accumulator buffer. This callback gives the resource provider the opportunity to free or otherwise deallocate any memory pointed to by fields within the accumulator buffer. The resource provider should not attempt to free the resource accumulator buffer.

The prototype for the AccumulatorFree function is as follows:

```
NTSTATUS
    AccumulatorFree (
    IN PVOID ProviderContext,
    IN OUT PVOID Accumulator
    );
```

AccumulatorCopy: Callback into the provider to be called to copy from one resource accumulator buffer to another. If NULL, the resource manager will just copy the buffer directly (e.g. using memcpy). This callback gives the resource provider the opportunity to copy any memory pointed to by fields within the accumulator buffer.

The prototype for the AccumulatorCopy function is as follows:

```
NTSTATUS
    AccumulatorCopy (
    IN PVOID ProviderContext,
    IN PVOID SrcAccumulator,
    IN OUT PVOID DestAccumulator
    );
```

The provider should assume that DestAccumulator is uninitialized memory. Specifically, the DestAccumulator buffer is not passed to any AccumulatorInit function before it is passed to the AccumulatorCopy function.

NotifyOnReserve: Callback into the provider to inform it that a resource has been reserved.

The prototype for the NotifyOnReserve function is as follows:

```
NTSTATUS
    NotifyOnReserve (
    IN PVOID ProviderContext,
    IN PVOID AttributeBuffer,
    );
```

The provider may fail this call by returning STATUS_RESOURCE_UNAVAILABLE. For example, maybe the device went bad and provider got this notification before it could unregister the resource. In this case, RM will rollback the reservation. The provider at the earliest opportunity will update the resource count.

NotifyOnUnReserve: Callback into the provider to inform it that a previously reserved resource amount has been unreserved.

The prototype for the NotifyOnReserve function is as follows:

```
NTSTATUS
    NotifyOnReserve (
    IN PVOID ProviderContext,
    IN PVOID AttributeBuffer,
    );
```

NotifyOnRemove: Callback into the provider to inform it that a previously added resource is being removed, either due to an error in the activity, or because a higher-level resource in the tree was removed, or because the provider called RmRemoveResourceFromConfiguration.

The prototype for the NotifyOnRemove function is as follows:

```
NTSTATUS
    NotifyOnRemove (
    IN PVOID ProviderContext,
    IN PVOID AttributeBuffer,
    );
```

The provider should use this callback to free up any data structures associated with the resource.

Note 1: The resource manager will call the NotifyOnRemove function from within RmRemoveResourceFromConfiguration. Therefore, the provider should not attempt to free any data structures associated with the reservation after returning from RmRemoveResourceFromConfiguration.

Note 2: The resource manager will not call the NotifyOnRemove function as a side effect of a failure within RmAddResourceToConfiguration. Therefore, if RmAddResourceToConfiguration fails for some reason, the provider should handle the cleanup of any data structures as part of handling that error.

ResourceHandle: Handle returned from RmRegisterResource to be used in other calls into the resource manager.

d) Return Values

STATUS_SUCCESS: The resource has been registered successfully.

Any other return value signifies an error.

2. RmUnregisterResource a) Prototype

```
NTSTATUS
    RmUnregisterResource (
    IN RM_HANDLE ResourceHandle
    );
```

b) Description

The resource provider should call this function when it needs to unregister its resource from the resource manager. The provider should use RmRemoveResourceFromConfiguration to remove any outstanding resources from all configurations before making this call. If the provider does not do this, RM will automatically purge all resources from the provider as if the provider had called RmRemoveResourceFromConfiguration.

c) Parameters

ResourceHandle: Handle originally returned from RmRegisterResource.

d) Return Values

STATUS_SUCCESS: The resource was successfully unregistered

3. RmLockResource

```
NTSTATUS
    RmLockResource (
    IN RM_HANDLE ResourceHandle,
    );
```

a) Description

The resource provider should call this function before it modifies any internal state, such as when the amount of resources that the provider represents has changed. This will allow the resource manager to synchronize with any changes to the provider's internal state.

b) Parameters

ResourceHandle: Handle originally returned from RmRegisterResource c) Return Values STATUS_SUCCESS: The resource was successfully locked.

4. RmUnlockResource

```
NTSTATUS
    RmUnlockResource (
    IN RM_HANDLE ResourceHandle,
    IN BOOL Update
    );
```

a) Description

The resource provider should call this function after it has completed modifying any internal state, such as when the amount of resources that the provider represents has changed. This will allow the resource manager to recalculate the resource usage of all activities in the system in response to changes in resource availability.

b) Parameters

ResourceHandle: Handle originally returned from RmRegisterResource

Update: This parameter should be set to TRUE if the amount of resources has changed. This will tell the resource manager to recalculate the resource usage of the system.

c) Return Values

STATUS_SUCCESS: The resource was successfully unlocked.

5. RmAddResourceToConfiguration a) Prototype

```
NTSTATUS
    RmAddResourceToConfiguration (
    IN PRM_ACTIVITY Activity,
    IN PVOID Tag OPTIONAL,
    IN RM_HANDLE ParentId,
    IN RM_RESOURCE ResourceHandle,
    IN PVOID AttributeBuffer OPTIONAL,
    IN ULONG AttributeBufferSize,
    OUT PRM_HANDLE ResourceId
    );
```

b) Description

Adds resource to a configuration.

c) Parameters

Activity: Previously created activity object.

Tag: A pointer supplied by the parent to uniquely identify/tag the child that is getting added.

ParentId: Resource handle of the parent of the resource that is getting added.

ResourceHandle: Handle returned from RmRegisterResource.

AttributeBuffer: Pointer to a buffer that contains data that is understood only by the provider (e.g., resource amount). If AttributeBufferSize is zero, this must be NULL.

Note that the resource manager will make an internal copy of this buffer for all future callback functions. Therefore, it is acceptable for the resource provider to create this buffer on its own stack and/or discard it after returning from RmAddResourceToConfiguration. However, the resource manager will not copy data pointed to by any internal fields of this structure. Such data must be maintained by the provider and must be accessible within any process context.

AttributeBufferSize: Size in bytes of AttributeBuffer. Should be zero if no data in buffer.

ResourceId: Handle returned by this call to represent this resource allocation.

d) Return Values

STATUS_SUCCESS or appropriate error code.

6. RmRemoveResourceFromConfiguration a) Prototype

```
NTSTATUS
    RmRemoveResourceFromConfiguration (
    IN PRM_ACTIVITY Activity,
    IN RM_HANDLE ResourceId
    );
```

b) Description

Removes a resource allocation from a configuration. If the resource is assigned to a provider it is freed automatically.

c) Parameters

Activity: Previously created activity object.

ResourceId: The handle returned from RmAddResourceToConfiguration.

d) Return Values

STATUS_SUCCESS or appropriate error code.

7. RmSetResourceAttributes a) Prototype

```
NTSTATUS
    RmSetResourceAttributes (
    IN PRM_ACTIVITY Activity,
    IN RM_HANDLE ResourceID,
    IN PVOID AttributeBuffer OPTIONAL,
    IN ULONG AttributeBufferSize
    );
```

b) Description

Changes the attributes on the resource.

c) Parameters

Activity: Previously created activity object.

ResourceID: The handle returned from RmAddResourceToConfiguration.

AttributeBuffer: Pointer to a buffer containing the new attributes. If AttributeBufferSize is zero, this must be NULL.

AttributeBufferSize: Size of buffer in bytes.

d) Return Values

STATUS_SUCCESS or appropriate error code.

8. RmGetDefaultActivityAndConfiguration a) Prototype

```
NTSTATUS
    RmGetDefaultActivityAndConfiguration(
    OUT PRM_ACTIVITY *Activity,
    OUT PRM_HANDLE ConfigId
    );
```

b) Description

Returns the default activity and configuration. Providers can use this call in cases where the provider does not know the activity and configuration to add resources to, such as the case of a legacy client.

c) Parameters

Activity: Returns the default activity.

ConfigId: Returns the default configuration.

d) Return Values

STATUS_SUCCESS or appropriate error code.

9. RmGetAttributeBuffer a) Prototype

```
NTSTATUS
    RmGetAttributeBuffer(
    IN PRM_ACTIVITY Activity,
    IN RM_HANDLE ResourceId,
    IN PVOID *Buffer
    );
```

b) Description

Gets the attribute buffer associated with a resource descriptor.

c) Parameters

Activity: Pointer to a previously created activity.

ResourceID: Handle to a resource descriptor in the activity by the above argument.

Buffer: Variable that receives the pointer to the attribute buffer.

d) Return Values

STATUS_SUCCESS or appropriate error code.

B. Consumer Interface

Consumer API Calls

1. RmCreateActivity a) Prototype

```
NTSTATUS
    RmCreateActivity (
    OUT PRM__ACTIVITY ActivityObject,
    IN ACCESS__MASK DesiredAccess,
    IN POBJECT__ATTRIBUTES ObjectAttributes OPTIONAL,
    IN REFGUID TypeGuid
    );
```

b) Description

This function creates a new activity object.

c) Parameters

ActivityObject: A pointer to the created activity object is returned here.

DesiredAccess: Access rights, e.g. ACTIVITY_QUERY_STATE, ACTIVITY_MODIFY_STATE.

ObjectAttributes: Supplies standard object attributes such as name, security, etc.

TypeGuid: The type of the activity, one of a set of predefined types. The activity type may be used to help determine the relative priority of the activity with respect to other activities.

d) Return Values

STATUS_SUCCESS or appropriate error code.

e) Notes

A single resource consumer can create multiple activities.

2. RmReserveResources a) Prototype

```
NTSTATUS
    RmReserveResources (
    IN PRM__ACTIVITY Activity,
    IN OUT PRM__ACTIVITY__STATUS ActivityStatus,
    IN PKEVENT Event,
    IN RM__HANDLE DesiredConfigId,
    );
```

b) Description

RM reserves resources for a configuration in the activity. The configuration chosen is based on availability of resources and the activity relative priority. The caller can optionally supply a valid ConfigId in which case RM will only attempt to reserve that configuration and fail otherwise. If the activity already had a satisfied configuration (i.e., resources are assigned to a configuration) on entry then the RM will interpret this as a request to see if more desirable configuration is available. RM will guarantee that on return at least the existing configuration is still available (assuming that it has not been evicted for other reasons, such as a higher priority activity needing resources).

This call is asynchronous. The use of the ActivityStatus and Event parameters allow this caller to wait until RM has determined whether the request can be satisfied.

c) Parameters

Activity: Handle of previously created activity.

ActivityStatus: This structure is used by RM to return the status of the request after it has been completed. This structure is defined as:

```
typedef struct__RM__ACTIVITY__STATUS
{
    NTSTATUS Status;
    ULONG Information;
} RM__ACTIVITY__STATUS, *PRM__ACTIVITY__STATUS;
```

When used with RmReserveResources, the Status field is used to hold the result of the operation, and the Information field receives the configuration ID that the RM satisfied. The information field is valid only if the value of Status is STATUS_SUCCESS.

Event: If RM cannot complete the reservation immediately, the caller should wait on this event to determine when the operation is complete.

DesiredConfigId: The caller may choose to reserve a specific configuration ID by initializing this parameter with that ID. Otherwise, it should be initialized with 0.

d) Return Values

STATUS_SUCCESS: if the RM can satisfy any configuration in the activity.

STATUS_RESOURCE_UNAVAILABLE: none of the configurations can be currently satisfied as resources are assigned to other higher priority activities.

STATUS_PENDING: if RM cannot complete the operation yet. In this case, the caller should wait on the Event handle until the operation is completed.

3. RmUnreserveResources a) Prototype

```
NTSTATUS
    RmUnreserveResources (
    IN PRM__ACTIVITY Activity
    );
```

b) Description

Unreserves resources associated with a configuration in an activity.

c) Parameters

Activity: Handle of previously created activity.

d) Return Values

STATUS_SUCCESS or error code.

4. RmGetActivityStatus a) Prototype

```
NTSTATUS
    RmGetActivityStatus (
    IN PRM__ACTIVITY Activity,
    IN OUT PRM__ACTIVITY__STATUS ActivityStatus,
    IN PKEVENT Event
    );
```

b) Description

Returns information on the changes to the status of an activity. This call is asynchronous. The use of the ActivityStatus and Event parameters allow the caller to wait until RM has determined that the status of the activity has changed.

c) Parameters

Activity: Handle of previously created activity.

ActivityStatus: This structure is used by RM to return the status of the request after it has been completed. This structure is defined as:

```
typedef struct_RM_ACTIVITY_STATUS
{
    NTSTATUS Status;
    ULONG Information;
} RM_ACTIVITY_STATUS, *PRM_ACTIVITY_STATUS;
```

When used with RmGetActivityStatus, the Status field is used to hold the result of the operation, and the Information field receives the reason. Examples include RM_RELEASE_CONFIGURATION, RM_BETTER_CONFIGURATION, etc. The information field is valid only if the value of Status is STATUS_SUCCESS.

Event: If there is currently no status pending, the caller should wait on this event to determine when new status information is available.

d) Return Values

STATUS_SUCCESS or appropriate error code.

5. RmCancelRequest a) Prototype

```
NTSTATUS
    RmCancelRequest(
    IN PRM_ACTIVITY Activity,
    );
```

b) Description

This call may be used to cancel any pending asynchronous calls. Currently, only RmReserveResources and RmGetResourceStatus are defined to be asynchronous.

This call cancels any pending RM requests which were initiated from the same thread calling RmCancelRequest. When RM cancels a transaction, it sets the Status field of the RM_ACTIVITY_STATUS structure to STATUS_CANCELLED and signals the corresponding event.

After canceling a transaction, the caller should always check the status field of the RM_ACTIVITY_STATUS structure to verify whether the transaction was actually cancelled, or whether the transaction successfully completed before it was cancelled.

c) Parameters

Activity: Handle of previously created activity.

d) Return Values

STATUS_SUCCESS: RM has canceled all transactions of the specified type.

6. RmCreateConfiguration a) Prototype

```
NTSTATUS
    RmCreateConfiguration (
    IN PRM_ACTIVITY Activity,
```

-continued

```
    IN ULONG Merit,
    OUT PRM_HANDLE ConfigId
    );
```

b) Description

Create configurations in the specified activity.

c) Parameters

Activity: Handle of previously created activity.

Merit—Importance of this configuration relative to the other configurations in this activity.

ConfigId—Handle to created configuration.

d) Return Values

STATUS_SUCCESS or appropriate error code.

7. RmRemoveConfiguration a) Prototype

```
NTSTATUS
    RmRemoveConfiguration (
    IN PRM_ACTIVITY Activity,
    IN RM_HANDLE ConfigId
    );
```

b) Description

Removes configurations from the specified activity.

c) Parameters

Activity: Handle of previously created activity.

ConfigId: Handle to the configuration to be removed. RM will automatically clean up any reserved resources.

d) Return Values

STATUS_SUCCESS or appropriate error code.

8. RmGetResourceParent a) Prototype

```
NTSTATUS
    RmGetResourceParent (
    IN PRM_ACTIVITY Activity,
    IN RM_HANDLE ResourceIdIn,
    OUT PRM_HANDLE ResourceIdReturned
    );
```

b) Description

Returns the parent ResourceId of ResourceIdIn.

c) Parameters

Activity: Handle of previously created activity.

ResourceIdIn: Handle to a ResourceId.

ResourceIdReturned: Pointer to a ResourceId. The resulting ResourceId is returned at this location.

d) Return Values

STATUS_SUCCESS or appropriate error code.

9. RmGetResourceChild a) Prototype

```
NTSTATUS
    RmGetResourceChild (
    IN PRM_ACTIVITY Activity,
    IN RM_HANDLE ResourceIdParent,
    IN RM_HANDLE ResourceIdIn,
    OUT PRM_HANDLE ResourceIdReturned
    );
```

b) Description

Returns the first child ResourceId of ResourceIdIn.

c) Parameters

Activity: Handle of previously created activity.

ResourceIdParent: Handle to a ResourceId or ConfigurationId.

ResourceIdIn: Handle to a ResourceId. If set to −1, the function returns the first child resource.

ResourceIdReturned: Pointer to a ResourceId. The resulting ResourceId is returned at this location.

d) Return Values

STATUS_SUCCESS or appropriate error code.

10. RmGetResourceInformation a) Prototype

```
NTSTATUS
    RmGetResourceInformation (
    IN PRM_ACTIVITY Activity,
    IN RM_HANDLE ResourceId,
    IN RM_RESOURCE_INFO_TYPE ResourceInfoType,
    IN ULONG AvailableBufferSize,
    OUT ULONG *RequiredBufferSize,
    OUT PVOID *ResourceInfo
    );
```

b) Description

Returns information about the specified ResourceId.

c) Parameters

Activity: Handle of previously created activity.

ResourceId: Handle to a ResourceId or ConfigurationId.

ResourceInfoType: An enum value specifying what type of information to return. Currently defined values, and the corresponding buffers they return, are:

ResourceInfo_Default

Returns the following structure in the buffer:

```
typedef struct_RM_RESOURCE_INFO_DEFAULT
{
    BOOL FailedReservation;             // This resource failed its last reservation
    BOOL DescendantFailedReservation;   // A descendant failed its last reservation
    BOOL PeerFailedReservation;         // Peer of same provider failed last
    reservation
    GUID ResourcePoolGUID;              // Resource GUID
    RM_HANDLE ResourcePoolHandle;       // Handle of provider
    ULONG TagLength;                    // Size of tag buffer
} RM_RESOURCE_INFO_DEFAULT;
```

ResourceInfo_Tag

Returns the tag originally specified when the resource was added.

ResourceInfo_Amount

Returns the following structure in the buffer:

```
typedef struct_RM_RESOURCE_INFO_AMOUNT
{
    ULONG AmountReserved;
    ULONG AmountInSystem;
    ULONG AmountAvailable;
    ULONG AmountUsed;
    ULONG AmountUsedPeak;
    WCHAR AmountLabel[32];
    WCHAR ProviderDescription[128];
} RM_RESOURCE_INFO_AMOUNT;
```

AvailableBufferSize: Size of buffer in bytes.

RequiredBufferSize: Size of data returned in buffer in bytes.

ResourceInfo: Pointer to a buffer into which RM will store the requested data.

d) Return Values

STATUS_SUCCESS or appropriate error code.

11. RmGetLastAccumulator a) Prototype

```
NTSTATUS
    RmGetLastAccumulator(
    IN PRM_ACTIVITY Activity,
    IN RM_HANDLE ProviderHandle,
    OUT PVOID *AccumulatorBuffer
    );
```

b) Description:

Returns the last accumulator buffer before adding any of the specified activities' resources into it.

c) Parameters:

Activity: Previously created activity object.

ProviderHandle: Handle returned from RmRegisterResource.

It AccumulatorBuffer: A pointer to the accumulator buffer is stored here on successful return.

d) Return Values

STATUS_SUCCESS or appropriate error code.

e) Comments

This call could be used in conjunction with RmGetResourcePeer to allow a resource provider to rebalance the resources within an activity if it would otherwise be evicted due to lack of resources.

12. RmGetResourcePeer a) Prototype

```
NTSTATUS
    RmGetResourcePeer (
    IN PRM_ACTIVITY Activity,
    IN RM_HANDLE ResourceProvider,
    IN RM_HANDLE ResourceIdIn,
    OUT PRM_HANDLE ResourceIdReturned
    );
```

b) Description

Returns the ResourceId of the next resource in the specified activity which has the specified resource provider.

c) Parameters

Activity: Handle of previously created activity.

ResourceProvider: Handle to a resource provider.

ResourceIdIn: Handle to a ResourceId. If this parameter is set to −1, the function returns the first resource associated with the specified provider.

ResourceIdReturned: Pointer to a ResourceId. The resulting ResourceId is returned at this location.

d) Return Values

STATUS_SUCCESS or appropriate error code.

e) Comments

Implementation of this call might invoke the following changes to the RmGetResourceInformation call:

1. Add a ResourceInfoType of ResourceInfo_Attributes to returns the attribute buffer associated with the resource.
2. Add a ULONG AttributeBufferLength field to the RM_RESOURCE_INFO_DEFAULT structure.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

We claim:

1. A resource management architecture implemented with at least a computing unit, the resource management architecture comprising:

multiple resource providers associated with resources;

multiple consumers that utilize the resources provided by the resource providers to perform associated tasks, at least one of the consumers specifying a first configuration that identifies a first set of one or more resources to perform a task and a second configuration that identifies a second set of one or more resources to perform the task; and a resource manager to arbitrate access to the resources provided by the resource providers on behalf of the consumers, the resource manager changing said one consumer from the first configuration to the second configuration to permit reallocation of at least portions of the resources among the consumers;

wherein the resource providers prevent the consumers from using the resources until the resources are reserved through the resource manager.

2. The resource management architecture of claim 1, wherein at least one of the consumers comprises an application program.

3. The resource management architecture of claim 1, wherein at least one resource provider acts as a consumer of a resource provided by at least one other resource provider.

4. The resource management architecture of claim 1, wherein the consumers submit requests to reserve the resources to the resource manager.

5. The resource management architecture of claim 4, wherein the resource providers prevent the consumers from using the resources without first reserving the resources with the submitted requests.

6. The resource management architecture of claim 1, wherein each of the resource providers comprises a resource quantifier that determines an amount of the associated resource that is available for allocation.

7. The resource management architecture of claim 6, wherein the resource quantifier comprises a counter that maintains a count of how many of the resources are available for allocation.

8. The resource management architecture of claim 6, wherein the resource quantifier comprises a temporal tracking component that tracks a duration that the resources is available for allocation.

9. The resource management architecture of claim 6, wherein the resource quantifier comprises a percentage tracking component that tracks a percentage of the resources that is available for allocation.

10. The resource management architecture of claim 1, wherein the resource manager exposes an application program interface, the resource providers and the consumers making calls to the resource manager via the application program interface.

11. The resource management architecture of claim 1, wherein the resource manager allocates the resources to the consumers according to a priority-based policy in which higher priority consumers are given precedence over lower priority consumers.

12. The resource management architecture of claim 1, wherein the first and second configurations each contains a set of one or more resource descriptors, each descriptor being an instance of a corresponding resource.

13. The resource management architecture of claim 12, wherein said each descriptor holds data including an identity of a resource provider associated with the resource and a quantity of the resource needed to perform the task.

14. The resource management architecture of claim 1, further comprising a policy manager to establish an allocation policy, the resource manager using the allocation policy to arbitrate access to the resources.

15. The resource management architecture of claim 1, further comprising an interface component to request a set of one or more of the resources on behalf of the consumers, the interface component submitting requests to the resource manager.

16. The resource management architecture of claim 1, wherein the resource providers are configured without any knowledge of real time, further comprising a scheduling component to schedule allocation of a set of the resources at a later time.

17. A resource management architecture implemented with at least a computing unit, the resource management architecture comprising:

multiple resource providers associated with resources;

multiple consumers that utilize the resources provided by the resource providers to perform associated tasks;

a resource manager to arbitrate access to the resources provided by the resource providers on behalf of the consumers using one or more communications with the resource providers;

one of the consumers creating an activity at the resource manager in association with a task to be performed and building multiple configurations for the activity, each configuration identifying a set of one or more of the resources to perform the task; and the resource manager being configured to reserve resources that satisfy at least one of the configurations and to subsequently switch the activity from said one configuration to another of the configurations to reallocate particular resources to or away from the activity.

18. The resource management architecture of claim 17, wherein the resource manager is configured to switch from said one configuration to said another configuration automatically.

19. The resource management architecture of claim 17, wherein the configurations are ranked in order of preference, the resource manager being configured to switch the activity from a more preferred configuration to a less preferred configuration.

20. The resource management architecture of claim 17, wherein the configurations are ranked in order of preference and the configuration with reserved resources is not highest ranked among the configurations, wherein the resource manager sends an upgrade notification to said one consumer when resources for a higher ranked configuration becomes available.

21. The resource management architecture of claim 20, wherein said one consumer, in response to the upgrade notification, requests the resource manager to reserve the resources for the higher ranked configuration.

22. A resource management architecture implemented with at least a computing unit, the resource management architecture comprising:

multiple resource providers that are associated with resources;

a resource manager to allocate the resources provided by the resource providers to one or more consumers;

at least one activity data structure created at the resource manager in association with a task to be performed by a corresponding consumer;

multiple configuration data structures created at the resource manager in association with the activity data structure, each configuration data structure describing a set of one or more resources used to perform the associated activity; and the resource manager being configured to switch among the configuration data structures of the associated activity data structure to change which of the resources are allocated to the consumer corresponding to the activity data structure and configured to interact with at least a portion of the multiple resource providers;

wherein at least one resource provider acts as a consumer of a resource provided by at least one other resource provider.

23. A resource management architecture implemented with at least a computing unit, the resource management architecture comprising:

multiple resource providers that are associated with resources;

a resource manager to allocate the resources provided by the resource providers to one or more consumers;

at least one activity data structure created at the resource manager in association with a task to be performed by a corresponding consumer;

multiple configuration data structures created at the resource manager in association with the activity data structure, each configuration data structure describing a set of one or more resources used to perform the associated activity; and the resource manager being configured to switch among the configuration data structures of the associated activity data structure to change which of the resources are allocated to the consumer corresponding to the activity data structure and configured to interact with at least a portion of the multiple resource providers;

wherein after switching from a first configuration data structure to a second configuration data structure, the resource manager automatically reserves the set of resources specified in the second configuration data structure; and wherein the resource manager notifies the consumer corresponding to the activity data structure when the resources specified in the first configuration data structure are once again available.

24. The resource management architecture of claim 23, wherein the consumer, in response to notification, requests the resource manager to reserve the resources specified in the first configuration data structure.

25. A resource management architecture implemented with at least a computing unit, the resource management architecture comprising:

a resource manager to allocate resources among multiple consumers;

an existing activity associated with a task to be performed by a corresponding consumer, the existing activity having first and second configurations that specify first and second sets of one or more resources used to perform the task, at least one resource of the one or more resources including an attribute that is opaque to the resource manager;

the resource manager being configured to reserve the first set of systems resources specified in the first configuration of the existing activity;

a new activity associated with another task to be performed by a corresponding consumer, the new activity having at least one configuration that specifies a particular resource reserved in the first configuration of the existing activity; and the resource manager being configured to change the existing activity from the first configuration to the second configuration so that at least part of the particular resource can be released from the existing activity for reservation to the new activity;

wherein the resource manager notifies the existing activity when the resources specified in the first configuration are once again available for reservation.

26. A resource management architecture implemented with at least a computing unit, the resource management architecture comprising:

a resource manager to allocate resources among multiple consumers;

an existing activity associated with a task to be performed by a corresponding consumer, the existing activity having first and second configurations that specify first and second sets of one or more resources used to perform the task, at least one resource of the one or more resources including an attribute that is opaque to the resource manager;

the resource manager being configured to reserve the first set of systems resources specified in the first configuration of the existing activity;

a new activity associated with another task to be performed by a corresponding consumer, the new activity having at least one configuration that specifies a particular resource reserved in the first configuration of the existing activity; and the resource manager being configured to change the existing activity from the first configuration to the second configuration so that at least part of the particular resource can be released from the existing activity for reservation to the new activity;

wherein the resource manager automatically changes the existing activity from the second configuration back to the first configuration when the resources specified in the first configuration are once again available for reservation.

27. A resource management architecture implemented with at least a computing unit, the resource management architecture comprising:

a resource manager to allocate resources among multiple consumers according to priorities in conjunction with multiple resource providers that are associated with the resources, the resource manager adapted to expose application programming interfaces for interacting with the multiple consumers and the multiple resource providers;

a low priority activity associated with a task to be performed by a corresponding consumer, the low priority activity having multiple configurations that specify sets of one or more resources used to perform the task, the configurations being ranked in order of preference;

the resource manager being configured to reserve the set of resources specified in a high ranked configuration of the low priority activity;

a high priority activity associated with another task to be performed by a corresponding consumer, the high priority activity having at least one configuration that specifies a particular resource reserved in the high ranked configuration of the low priority activity; and the resource manager being configured to downgrade the low priority activity from the high ranked configuration to a lower ranked configuration so that at least part of the particular resource can be reallocated from the low priority activity to the high priority activity.

28. The resource management architecture of claim 27, wherein the resource manager is configured to downgrade the low priority activity automatically.

29. The resource management architecture of claim 27, wherein the resource manager notifies the low priority activity of the downgrade.

30. The resource management architecture of claim 27, wherein the resource manager notifies the low priority activity when the set of resources specified in the higher ranked configuration are once again available for reservation.

31. A method comprising:

receiving a request from a first consumer to reserve resources to perform a task;

establishing, for the first consumer, multiple alternate configurations of the resources that may be utilized to perform the task using, at least partially, resource providers that are associated with the resources;

reserving the resources specified in one of the configurations for allocation to the first consumer;

receiving a request from a second consumer to reserve a set of one or more resources including at least one common resource that is already reserved for the first consumer;

shifting the first consumer from said one configuration to another configuration to free at least part of the common resource for reservation for allocation to the second consumer; and switching from said another configuration back to said one configuration when more of the common resource becomes available.

32. A method comprising:

creating a new activity in association with a task to be performed;

building multiple configurations for the new activity each configuration identifying a different set of one or more resources used to perform the task, the configurations being ranked in order of preference;

evaluating a current allocation of the resources among existing activities by calling an accumulator function of each respective resource provider of multiple resource providers that are respectively associated with the resources; and reserving the set of one or more resources specified in a highest ranking configuration;

wherein an existing activity or another new activity requests a resource identified in the highest ranking configuration, and further comprising downgrading from the highest ranking configuration to a lower ranking configuration to free at least part of the requested resource for allocation to the existing activity or the other new activity; and wherein said existing or other new activity subsequently releases at least part of the requested resource, and further comprising notifying the new activity that a higher ranking configuration is available.

33. A method comprising:

creating a new activity in association with a task to be performed;

building multiple configurations for the new activity, each configuration identifying a different set of one or more resources used to perform the task, the configurations being ranked in order of preference;

evaluating a current allocation of the resources among existing activities by calling an accumulator function of each respective resource provider of multiple resource providers that are respectively associated with the resources; and reserving the set of one or more resources specified in a highest ranking configuration;

wherein an existing activity or another new activity requests a resource identified in the highest ranking configuration, and further comprising downgrading from the highest ranking configuration to a lower ranking configuration to free at least part of the requested resource for allocation to the existing activity or the other new activity; and wherein said existing or other new activity subsequently releases the requested resource, and further comprising upgrading from the lower ranking configuration to the highest ranking configuration to once again reserve more of the requested resource.

34. A computer-readable medium having computer-executable instructions that, when executed, direct a computing device to:

reserve, for a first consumer, resources specified in one of multiple configurations for allocation to the first consumer;

receive a request from a second consumer to reserve a set of one or more resources including at least one common resource that is already reserved for the first consumer;

trace dependent resources from the common resource to another resource that is associated with a resource provider known to the first consumer;

notify, by the resource provider, the first consumer that the common resource is being preempted; and shift the first consumer from said one configuration to another configuration to free the common resource for reservation for allocation to the second consumer.

35. An operating system embodied on the computer-readable medium of claim 34 and comprising the computer-executable instructions.

36. A computer-readable medium having computer-executable instructions that, when executed, direct a computing device to:

create a new activity in association with a task to be performed;

build multiple configurations for the new activity, each configuration identifying a different set of one or more resources in a manner that indicates inter-resource relationships used to perform the task, the configurations being ranked in order of preference;

reserve the set of one or more resources specified in a highest ranking configuration; and in an event that one of the resources specified in the highest ranking configuration is required by another activity, shift to a lower ranking configuration that does not specify the required resource to thereby release the required resource for allocation to said another activity.

37. An operating system embodied on the computer-readable medium of claim 36 and comprising the computer-executable instructions.

* * * * *